(12) United States Patent
Maede et al.

(10) Patent No.: US 11,892,675 B2
(45) Date of Patent: Feb. 6, 2024

(54) ILLUMINATION DEVICE AND DISPLAY DEVICE

(71) Applicant: Japan Display Inc., Tokyo (JP)

(72) Inventors: Yuji Maede, Tokyo (JP); Shinichi Komura, Tokyo (JP); Hiroaki Kijima, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 18/169,896

(22) Filed: Feb. 16, 2023

(65) Prior Publication Data

US 2023/0296824 A1 Sep. 21, 2023

(30) Foreign Application Priority Data

Feb. 17, 2022 (JP) .................. 2022-022999

(51) Int. Cl.
*F21V 8/00* (2006.01)

(52) U.S. Cl.
CPC .......... *G02B 6/0061* (2013.01); *G02B 6/0036* (2013.01); *G02B 6/0068* (2013.01)

(58) Field of Classification Search
CPC ... G02B 6/0036; G02B 6/0046; G02B 6/0048
See application file for complete search history.

(56) References Cited

U.S. PATENT DOCUMENTS

| 2011/0116010 A1* | 5/2011 | Nagata | G02B 6/005 |
| | | | 349/62 |
| 2013/0051072 A1* | 2/2013 | Wen | G02B 6/0043 |
| | | | 362/611 |
| 2019/0212560 A1* | 7/2019 | Sugiyama | G02B 6/00 |
| 2021/0041620 A1 | 2/2021 | Kijima et al. | |

FOREIGN PATENT DOCUMENTS

| JP | 2021-26905 A | 2/2021 | |
| WO | WO-2008088134 A1 * | 7/2008 | G02B 6/0038 |

* cited by examiner

*Primary Examiner* — Eric T Eide
(74) *Attorney, Agent, or Firm* — XSENSUS LLP

(57) ABSTRACT

According to one embodiment, an illumination device comprises a light guide, a light source, a reflective layer, a first prism and a second prism, wherein the light guide has a thickness in a second direction increasing toward a second side surface, the first prism and the second prism have cross-sectional shapes being formed in a triangle shape, a first height of the first prism in the second direction is smaller than a second height of the second prism in the second direction.

8 Claims, 11 Drawing Sheets

US 11,892,675 B2

ILLUMINATION DEVICE AND DISPLAY DEVICE

CROSS-REFERENCE TO RELATED APPLICATIONS

This application is based upon and claims the benefit of priority from Japanese Patent Application No. 2022-022999, filed Feb. 17, 2022, the entire contents of which are incorporated herein by reference.

FIELD

Embodiments described herein relate generally to an illumination device and a display device.

BACKGROUND

For example, a display device such as a liquid crystal display device includes a display panel having a pixel and an illumination device such as a backlight that illuminates the display panel. The illumination device includes a light source that emits light, and a light guide that is irradiated with the light from the light source.

The light from the light source is incident on the light guide from a side surface of the light guide, propagates in the light guide, and exits from an emission surface corresponding to one main surface of the light guide. For example, a configuration in which a reflective layer is provided on the opposite side of the light source and one light guide is provided is also known.

DETAILED DESCRIPTION

Figure 1:
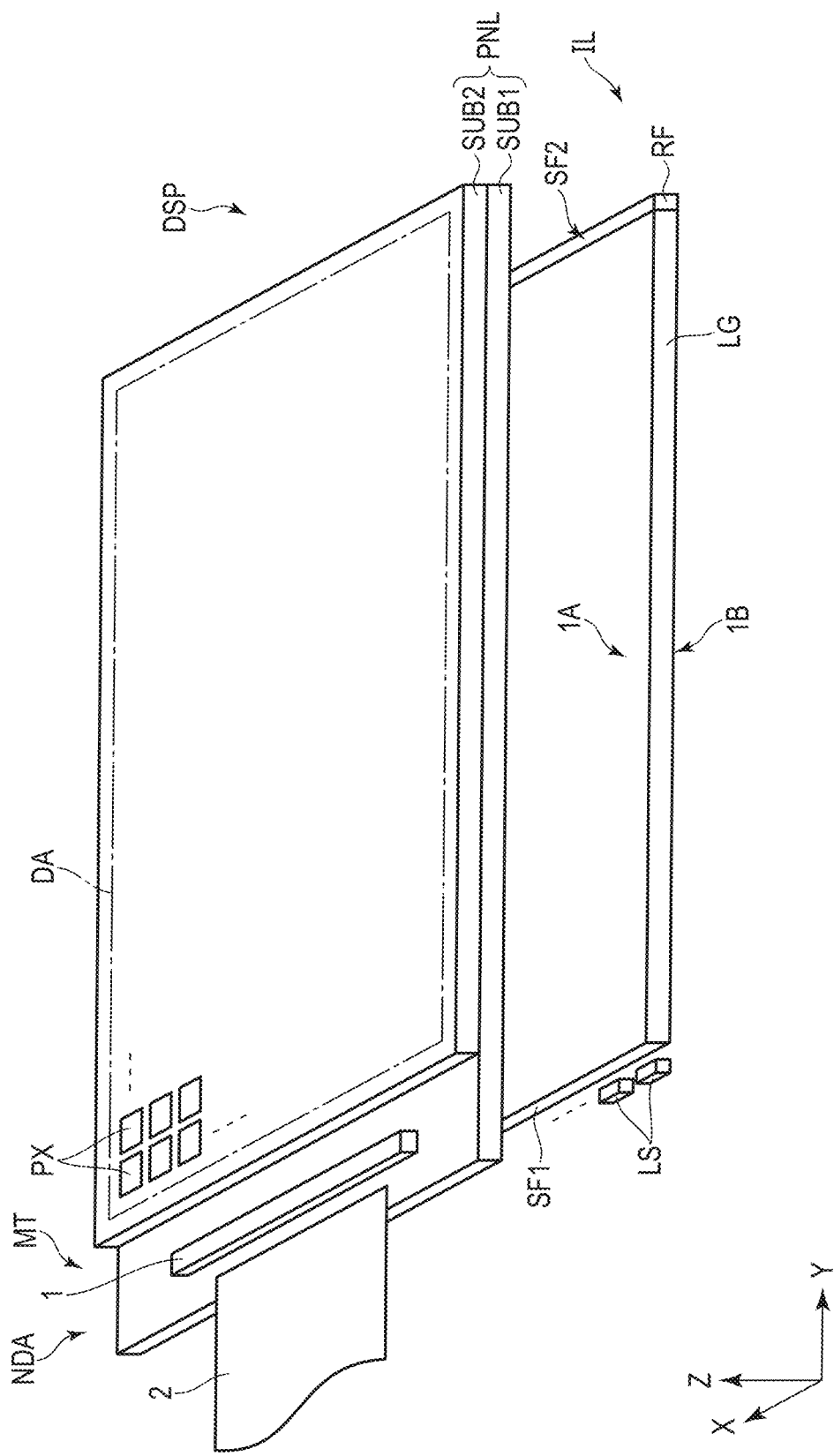
FIG. 1 is an exploded perspective view showing a configuration example of a display device according to a first embodiment.

In general, according to one embodiment, an illumination device comprises a light guide including: a first side surface, a second side surface opposed to the first side surface in a first direction, a main surface, and an opposing surface opposed to the main surface in a second direction intersecting the first direction; a light source that is opposed to the first side surface and emits light to the first side surface; a reflective layer provided on the second side surface; a first prism provided on the opposing surface; and a second prism provided on a side closer to the second side surface in the first direction than the first prism on the opposing surface, wherein the light guide has a thickness in the second direction increasing from the first side surface toward the second side surface in the first direction, the opposing surface includes a first slope, a second slope located on a side closer to the second side surface than the first slope in the first direction, a third slope located on a side closer to the second side surface than the second slope in the first direction, a fourth slope located on a side closer to the second side surface than the third slope in the first direction, a first plane that connects the first slope and the second slope and is parallel to the main surface, and a second plane that connects the third slope and the fourth slope and is parallel to the main surface, the first prism and the second prism have cross-sectional shapes being formed in a triangle shape protruding to an opposite side of the opposing surface in the second direction, the first prism is disposed on the first plane, the second prism is disposed on the second plane, a first height of the first prism in the second direction is smaller than a second height of the second prism in the second direction, and a sum of the first height, a third height of the first slope in the second direction, and a fourth height of the second slope in the second direction is larger than a sum of the second height, a fifth height of the third slope in the second direction, and a sixth height of the fourth slope in the second direction.

According to another embodiment, an illumination device comprises a light guide including: a first side surface, a second side surface opposed to the first side surface in a first direction, a main surface, and an opposing surface that is opposed to the main surface in a second direction intersecting the first direction and is parallel to the main surface; a light source that is opposed to the first side surface and emits light to the first side surface; a reflective layer provided on the second side surface; a first prism group provided on the opposing surface; and a second prism group provided on a side closer to the second side surface in the first direction than the first prism group on the opposing surface, wherein the first prism group includes a first prism, a second prism located on a side closer to the second side surface than the first prism in the first direction, and a third prism located on a side closer to the second side surface than the second prism in the first direction, the second prism group includes a fourth prism, a fifth prism located on a side closer to the second side surface than the fourth prism in the first direction, and a sixth prism located on a side closer to the second side surface than the fifth prism in the first direction, a first height of the second prism in the second direction is smaller than a second height of the fifth prism in the second direction, and a sum of the first height, a third height of the first prism in the second direction, and a fourth height of the third prism in the second direction is larger than a sum of the second height, a fifth height of the fourth prism in the second direction, and a sixth height of the sixth prism in the second direction.

According to another embodiment, an illumination device comprises a light guide including: a first side surface, a second side surface opposed to the first side surface in a first direction, a third side surface intersecting the second side surface, a fourth side surface that is opposed to the third side surface in a third direction, which intersects the first direction and a second direction intersecting the first direction, and intersects the second side surface, a first surface connecting the first side surface and the third side surface, and a second surface connecting the first side surface and the fourth side surface; a first light source, a second light source, and a third light source that are opposed to the first side surface and emit light to the first side surface; and a reflective layer provided on the second side surface, wherein a first length of the first side surface in the third direction is smaller than a second length of the second side surface in the third direction, the second light source is interposed between the first light source and the third light source in the third direction, and a first light intensity ratio of the first light source and the third light source is higher than a second light intensity ratio of the second light source.

An object of the present embodiment is to provide an illumination device and a display device.

Embodiments will be described hereinafter with reference to the accompanying drawings.

Note that the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

In the embodiments, a transmissive-type liquid crystal display device is disclosed as an example of a display device DSP. In addition, as an example of the illumination device, an illumination device used as a backlight of the transmissive-type liquid crystal display device is disclosed.

Incidentally, a principal configuration disclosed in the embodiments can also be applied in a liquid crystal display device having a reflective function of reflecting external light and using such reflected light for display in addition to a transmissive function, an electronic paper-type display device having an electrophoretic element and the like, a display device to which micro-electromechanical systems (MEMS) are applied, a display device to which electrochromism is applied, or the like.

In addition, the principal configuration disclosed in the present embodiment can also be applied to an illumination device used for applications other than the backlight.

First Embodiment

FIG. 1 is an exploded perspective view showing a configuration example of a display device DSP according to the present embodiment. The display device DSP is a liquid crystal display device, but is sometimes referred to simply as the display device hereinafter.

FIG. 1 shows a direction X (a third direction), a direction Y (a first direction) and a direction Z (a second direction). The direction X, the direction Y and the direction Z are orthogonal to each other, but may intersect at an angle other than 90°. The direction X and the direction Y correspond to directions parallel to a main surface of a substrate which constitutes the display device DSP, and the direction Z corresponds to a thickness direction of the display device DSP.

In this specification, a direction from a first substrate SUB1 towards a second substrate SUB2 is referred to as "upward" (or simply above) and a direction from the second substrate SUB2 towards the first substrate SUB1 is referred to as "downward" (or simply blow).

In the specification, with such expressions "a second member above a first member" and "a second member below a first member", the second member may be in contact with the first member or may be remote from the first member.

In addition, it is assumed that there is an observation position to observe the display device DSP on a tip side of an arrow in the direction Z, and viewing from this observation position toward the X-Y plane defined by the direction X and the direction Y is referred to as a plan view. An X-Z plane is defined by the direction X and the direction Z. A Y-Z plane is defined by the direction Y and the direction Z.

In addition, "lengths in the direction X and the direction Y of a predetermined substance, object, or region" are sometimes referred to as "widths", and a "length in the direction Z of a predetermined substance, object, or region" is sometimes referred to as a "thickness" or a "height".

The display device DSP includes a display panel PNL, an illumination device IL, an IC chip 1, and a wiring board 2. The display device DSP has a display region (or active area) DA and a non-display region (or non-active area) NDA. The display region DA is a region where an image is displayed. The non-display region NDA is a region where no image is displayed, and is located outside the display region DA.

The display panel PNL includes the first substrate SUB1 and the second substrate SUB2. The first substrate SUB1 and the second substrate SUB2 are opposed to each other. A display function layer (a liquid crystal layer LC to be described later in the present embodiment) is provided between the first substrate SUB1 and the second substrate SUB2.

In the display panel PNL, the display region DA is located substantially at a center of a region where the first substrate SUB1 and the second substrate SUB2 are opposed to each other. The display panel PNL includes, for example, a plurality of pixels PX arrayed in a matrix in the display region DA.

The IC chip 1 and the wiring board 2 sometimes read a signal from the display panel PNL, but primarily function as a signal source that supplies a signal to the display panel PNL. The IC chip 1 and the wiring board 2 are located in the non-display region NDA.

In the example shown in FIG. 1, the IC chip 1 and the wiring board 2 are mounted on a mounting portion MT of the first substrate SUB1 extending outward from one substrate edge (alternatively, sometimes referred to as a substrate end portion) of the second substrate SUB2. The wiring board 2 is, for example, a bendable flexible printed circuit. The IC chip 1 may be provided on the wiring board 2.

The illumination device IL is opposed to the display panel PNL and illuminates the display panel PNL. The illumination device IL includes a light guide LG, a plurality of light sources LS, and a reflective layer RF. The illumination device IL, the first substrate SUB1, and the second substrate SUB2 are disposed toward the tip side of the arrow in the direction Z in the described order.

The light guide LG is an insulating substrate such as a glass substrate or a plastic substrate. The light guide LG is formed using a substrate made of a material containing an acrylic resin, for example, an acrylic substrate. The light guide LG is formed in a flat plate shape spreading in the X-Y plane.

The light guide LG includes a main surface 1A opposed to the display panel PNL, an opposing surface 1B located on the opposite side of the main surface 1A in the direction Z, a side surface SF1, and a side surface SF2 located on the opposite side of the side surface SF1 in the direction Y. The opposing surface 1B is opposed to the main surface 1A in the direction Z. The main surface 1A is, for example, parallel to the X-Y plane. The opposing surface 1B has, for example, a part that is non-parallel to the X-Y plane. In other words, for example, the opposing surface 1B has a part that is non-parallel to the main surface 1A. Incidentally, the main surface 1A and the opposing surface 1B may be parallel to each other.

The side surface SF1 corresponds to an end surface of the light guide LG on the opposite side to a tip side of an arrow in the direction Y. The side surface SF1 is sometimes also referred to as a light incident surface. The side surface SF2 is opposed to the side surface SF1 in the direction Y. The side surface SF2 corresponds to an end surface of the light guide LG on the tip side of the arrow in the direction Y. The side surface SF2 is sometimes also referred to as an opposite light incident surface.

The side surface SF1 and the side surface SF2 are opposed to each other in the direction Y. The side surface SF1 and the side surface SF2 are, for example, parallel to the X-Z plane and are parallel to each other. Incidentally, the side surface SF1 and the side surface SF2 may be non-parallel to the X-Z plane, and may be non-parallel to each other.

The light sources LS are arranged to be spaced apart in the direction X. In the example shown in FIG. 1, each of the light sources LS is opposed to the side surface SF1. In addition, the light sources LS are arranged along the side surface SF1 to be spaced apart in the direction X. Incidentally, the light sources LS may be continuously arranged in the direction X along the side surface SF1.

The light source LS is, for example, a laser light source such as a semiconductor laser that emits a polarized laser beam. Incidentally, the light source LS may be a light source of unpolarized light. In addition, the light source LS is not limited to one that emits a laser beam, and may be, for example, a light-emitting diode.

Each of the light sources LS may include a plurality of light emitting elements that emit beams of light of different colors. For example, each of the light sources LS includes three light emitting elements that emit red light, green light, and blue light.

Incidentally, each of the light sources LS may include a light emitting element other than the three light emitting elements that emit red light, green light, and blue light. In the case of including the three light emitting elements that emit red light, green light, and blue light, the light sources LS can obtain light of a mixed color (for example, white) of these colors.

The reflective layer RF is made of a material that reflects light. The reflective layer RF is provided at an end portion of the light guide LG on the opposite side of the light source LS in the direction Y. In the example shown in FIG. 1, the reflective layer RF is provided on the side surface SF2 of the light guide LG. For example, the reflective layer RF is applied, bonded, or closely attached to the side surface SF2 of the light guide LG.

Figure 2:
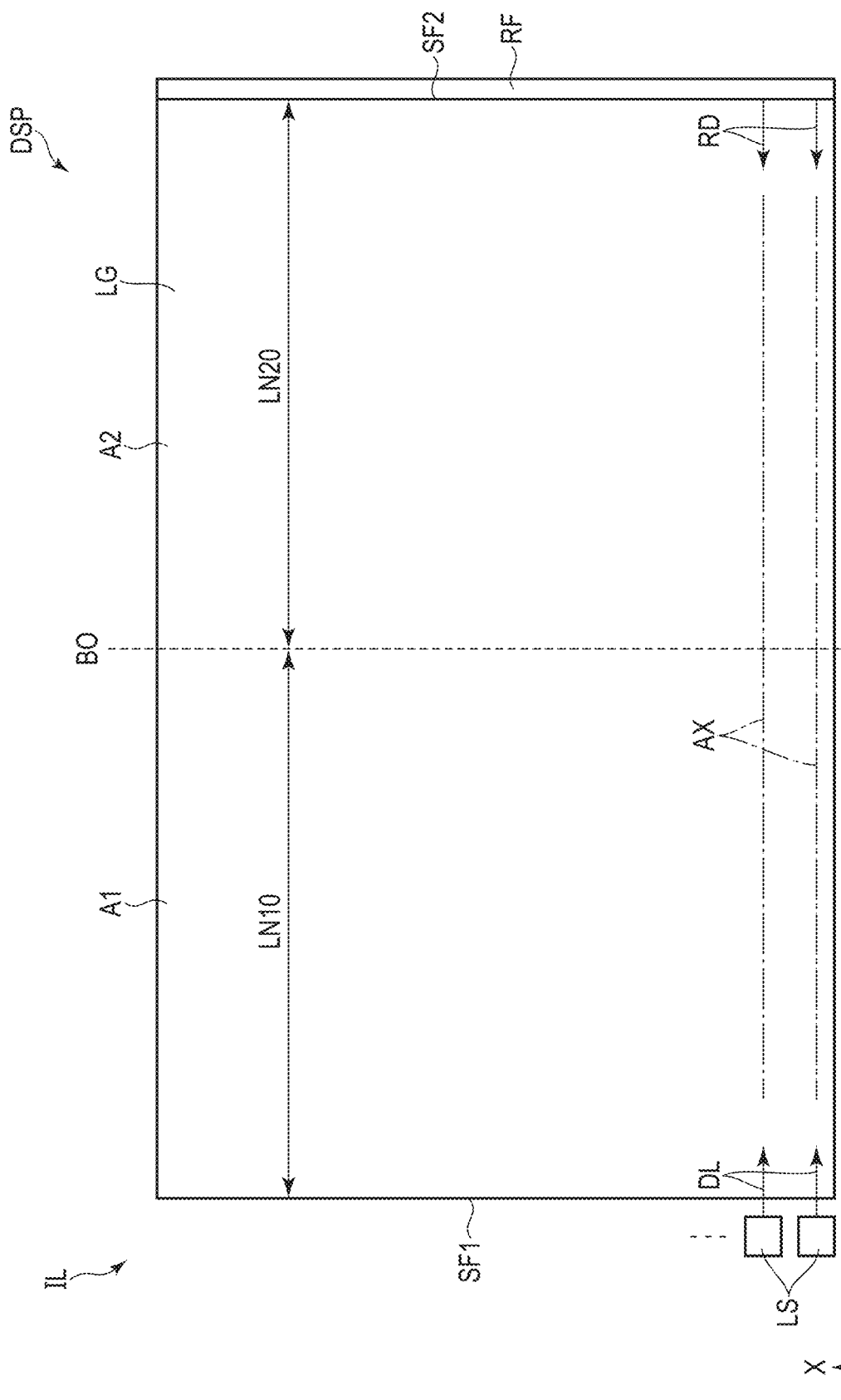
FIG. 2 is a plan view of an illumination device shown in FIG. 1.

FIG. 2 is a plan view of the illumination device IL shown in FIG. 1. As shown in FIG. 2, the light guide LG includes a first region A1, a second region A2, and a boundary BO between the first region A1 and the second region A2.

The first region A1 has a length LN10 in the direction Y. The second region A2 has a length LN20 in the direction Y. The length LN10 and the length LN20 are the same. When the length LN10 and the length LN20 are the same, the boundary BO corresponds to a center position of a width of the light guide LG in the direction Y. Incidentally, the length LN10 and the length LN20 are not necessarily the same.

In the present specification, the expressions "same", "identical", "equivalent", and "match" include not only a case where a plurality of target objects, spaces, regions, and the like have exactly the same physical quantity, material, configuration (structure), and the like but also include a case where there is a slight difference to such an extent that can be regarded as being substantially the same.

In the example shown in FIG. 2, the side surface SF1 is located at an end portion of the first region A1 on the opposite side to the tip side of the arrow in the direction Y. The side surface SF2 is located at an end portion of the second region A2 on the tip side of the arrow in the direction Y. The boundary BO corresponds to the middle between the side surface SF1 and the side surface SF2.

The light source LS emits light in an emission direction DL toward the side surface SF1. The intensity of the light emitted by the light source LS is the highest on an optical axis AX, and the emission direction DL is parallel to the optical axis AX. The light (hereinafter, sometimes also referred to as outgoing light), which has been emitted from the light source LS in the emission direction DL and incident on the light guide LG from the light incident surface (side surface) SF1, travels in the emission direction DL.

Hereinafter, the term "outgoing light" is sometimes used to mean a "main ray of outgoing light". A part of the outgoing light is guided in the light guide LG and reflected by the reflective layer RF (or the opposite light incident surface SF2) in a reflection direction RD which is an opposite direction to the emission direction DL. The light (hereinafter, sometimes also referred to as return light) reflected by the reflective layer RF (or the opposite light incident surface SF2) travels in the reflection direction RD.

Hereinafter, the term "return light" is sometimes used to mean a "main ray of return light". The intensity of the return light is the highest on the optical axis AX, and the reflection direction RD is parallel to the optical axis AX. Incidentally, the intensity of the return light is not necessarily the highest on the optical axis AX, and the reflection direction RD is not necessarily parallel to the optical axis AX.

Figure 3:
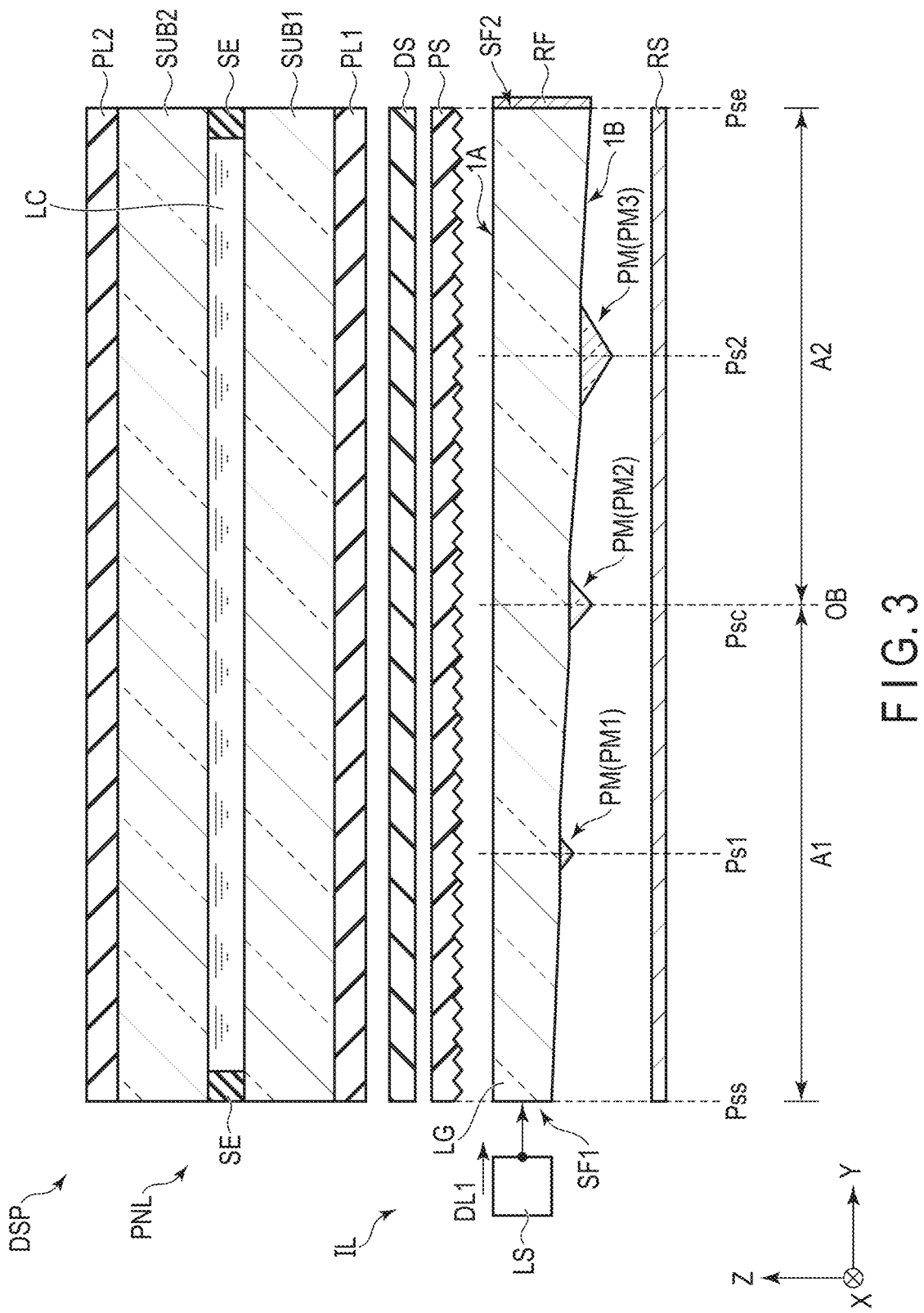
FIG. 3 is a cross-sectional view of the display device shown in FIG. 1.

FIG. 3 is a cross-sectional view of the display device DSP shown in FIG. 1. As shown in FIG. 3, the display panel PNL further includes the liquid crystal layer LC, a sealant SE, a polarizer PL1, and a polarizer PL2.

The liquid crystal layer LC and the sealant SE are located between first substrate SUB1 and second substrate SUB2. The sealant SE bonds the first substrate SUB1 to the second substrate SUB2, and seals the liquid crystal layer LC between the first substrate SUB1 and the second substrate SUB2.

The polarizer PL1 is bonded to a lower surface of the first substrate SUB1. The polarizer PL2 is bonded to an upper surface of the second substrate SUB2. A polarization axis of the polarizer PL1 and a polarization axis of the polarizer PL2 are orthogonal to each other, for example.

The illumination device IL further includes prisms PM (prism PM1, prism PM2, prism PM3, and so on), a diffusion sheet DS, a prism sheet PS, and a reflective sheet RS.

Incidentally, a plurality of, for example, two prism sheets PS may be provided to overlap each other in the direction Z.

The diffusion sheet DS is located between the display panel PNL and the light guide LG. The diffusion sheet DS diffuses light incident on the diffusion sheet DS to make the luminance of the light uniform.

The prism sheet PS is located between the diffusion sheet DS and the light guide LG. For example, the prism sheet PS condenses light emitted from the main surface 1A of the light guide LG in the direction Z.

The prism sheet PS includes a plurality of prisms continuously arranged in the direction Y. The prisms of the prism sheet PS protrude toward the main surface 1A in the direction Z. The prism of the prism sheet PS has a triangular cross-sectional shape parallel to the Y-Z plane (hereinafter, sometimes referred to simply as cross-sectional shape). The cross-sectional shapes of the prisms of the prism sheet PS are similar to each other. Hereinafter, a base angle of a prism of the prism sheet PS is sometimes referred to as an inverse prism base angle.

The reflective sheet RS is opposed to the opposing surface 1B of the light guide LG. For example, the reflective sheet RS reflects light leaking from the inside of the light guide LG and causes the light to be incident on the light guide LG again.

In the example shown in FIG. 3, a height of the side surface SF1 in the direction Z is smaller than a height of the side surface SF2 in the direction Z. In other words, the height of the side surface SF2 in the direction Z is larger than the height of the side surface SF1 in the direction Z. A thickness of the light guide LG increases as proceeding to the tip side of the arrow in the direction Y. In other words, the thickness of the light guide LG increases from the side surface SF1 toward the side surface SF2 in the direction Y.

Here, the thickness of the light guide LG corresponds to a length of a portion between the main surface 1A and the opposing surface 1B in the direction Z. In the light guide LG, the opposing surface 1B is angled downward with respect to the main surface 1A. In other words, in the light guide LG, the opposing surface 1B is angled toward the opposite side to the tip side of the arrow in the direction Z with respect to the main surface 1A.

In the light guide LG, the opposing surface 1B is angled downward as proceeding to the tip side of the arrow in the direction Y with respect to the main surface 1A. In other words, the opposing surface 1B is angled toward the opposite side to the tip side of the arrow in the direction Z as proceeding to the tip side of the arrow in the direction Y with respect to the main surface 1A.

FIG. 3 shows positions in the direction Y (hereinafter, sometimes referred to simply as positions), that is, a position Pss, a position Ps1, a position Psc, a position Ps2, and a position Pse of light guide LG. The position Pss corresponds to a position of the side surface SF1 in the direction Y. The position Pse corresponds to a position of the side surface SF2 in the direction Y. The position Psc corresponds to an intermediate position between the position Pss and the position Pse in the direction Y. The position Ps1 corresponds to a position between the position Pss and the position Psc in the direction Y. The position Ps2 corresponds to a position between the position Psc and the position Pse in the direction Y.

The position Ps1 is located closer to the side surface SF2 than the position Pss in the direction Y. The position Psc is located closer to the side surface SF2 than the position Ps1 in the direction Y. The position Ps2 is located closer to the side surface SF2 than the position Psc in the direction Y. The position Pse is located closer to the side surface SF2 than the position Ps2 in the direction Y.

The prisms PM are disposed on the lower side of the light guide LG to be spaced apart in the direction Y. In other words, the prisms PM are disposed to be spaced apart in the direction Y on the opposing surface 1B of the light guide LG.

The prisms PM are disposed or formed such that the height thereof increases as proceeding to the tip side of the arrow in the direction Y. In other words, the prisms PM are formed or disposed such that the height decreases as proceeding to the opposite side to the tip side of the arrow in the direction Y.

A shape of each of the prisms PM is a shape protruding downward (inverted prism shape). In other words, the shape of each of the prisms PM is a shape protruding to the opposite side of the opposing surface 1B in the direction Z. A cross-sectional shape of each of the prisms PM is a triangle (inverted triangle) shape protruding downward. In other words, the cross-sectional shape of each of the prisms PM is a triangle shape protruding to the opposite side of the opposing surface 1B in the direction Z.

Incidentally, the shape of each of the prisms PM may be a shape other than the inverted prism shape. Alternatively, the cross-sectional shape of each of the prisms PM may be a shape other than the triangle (inverted triangle). Incidentally, the prisms PM may be formed separately from the light guide LG or may be formed integrally with the light guide LG.

In the example shown in FIG. 3, the prisms PM includes the prism PM1, the prism PM2, and the prism PM3. Incidentally, the prisms PM may include four or more prisms or two or less prisms.

The prism PM1, the prism PM2, and the prism PM3 are disposed on the lower side of the light guide LG to be spaced apart in the direction Y. In other words, the prism PM1, the prism PM2, and the prism PM3 are disposed to be spaced apart in the direction Y on the opposing surface 1B of the light guide LG.

The prism PM1 is disposed at the position Ps1 of the light guide LG. The prism PM2 is disposed at the position Psc of the light guide LG. The prism PM3 is disposed at the position Ps2 of the light guide LG. Incidentally, the prisms PM may be disposed at predetermined positions of the light guide LG in the direction Y other than the position Ps1, the position Psc, and the position Ps2.

The light source LS is separated apart from the side surface SF1. The light source LS emits light toward the side surface SF1 of the light guide LG. Outgoing light emitted from the light source LS is incident on the light guide LG from the side surface SF1. Light incident on the prism PM out of the outgoing light travels upward in the light guide LG.

In addition, light that has reached the reflective layer RF after being guided by the light guide LG out of the outgoing light is reflected by the reflective layer RF. Light incident on the prism PM out of return light, reflected by the reflective layer RF and a part of light incident on the opposing surface 1B out of the return light travel upward in the light guide LG.

Figure 4:
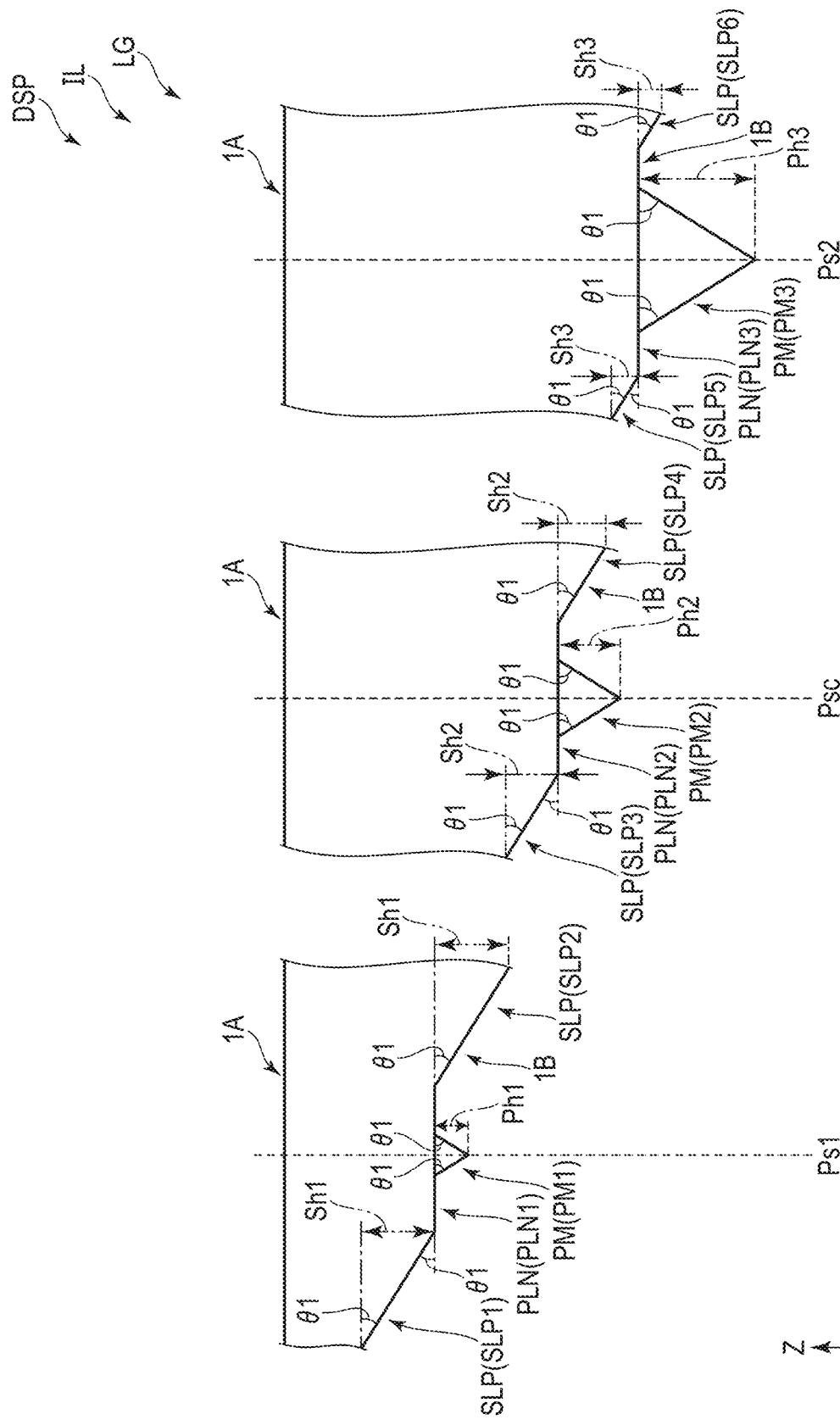
FIG. 4 is a cross-sectional view showing an arrangement example of a prism according to the first embodiment.

FIG. 4 is a cross-sectional view showing an arrangement example of the prism PM according to the present embodiment. FIG. 4 shows only a configuration required for the description.

The light guide LG has a plurality of slopes SLP and a plurality of planes PLN on the opposing surface 1B side. In other words, the opposing surface 1B has the slopes SLP and the planes PLN. The slope SLP corresponds to a surface extending in a direction intersecting the direction Y. In other words, the slope SLP corresponds to a surface extending in a direction intersecting the main surface 1A in the Y-Z plane.

The plane PLN corresponds to a surface extending parallel to the direction Y. The plane PLN corresponds to a surface extending parallel to the main surface 1A. On the opposing surface 1B, the slope SLP and the plane PLN are alternately disposed.

In the light guide LG, a prism structure having a combination of at least one slope SLP and at least one prism PM are provided at regular intervals such that no stripe is visually recognized. In other words, the light guide LG is provided with the prism structures each having a combination of at least one slope SLP and at least one prism PM at a predetermined density such that no stripe is visually recognized.

In the example shown in FIG. 4, the light guide LG has a plurality of prism structures each having a combination of two slopes SLP and one prism PM interposed between the two slopes SLP. Incidentally, the light guide LG may have a prism structure having a combination of the number of slopes SLP other than two and the number of prisms PM other than one.

The slopes SLP are formed to contribute to return light, for example. In other words, the slopes SLP are formed so as not to contribute to outgoing light but to contribute only to the return light. Incidentally, the slopes SLP may be formed so as to contribute to the outgoing light. Alternatively, the slopes SLP may be formed so as to contribute to the outgoing light and the return light.

Each of the slopes SLP is disposed so as to be located on the lower side as proceeding to the tip side of the arrow in the direction Y. In other words, thicknesses of the light guides LG respectively corresponding to the slopes SLP increase as proceeding to the tip side of the arrow in the direction Y.

Heights of the slopes SLP are set according to the heights of the prisms PM, respectively. The slopes SLP are disposed or formed such that the sum of a height of each of the slopes SLP, a height of each of the other slopes SLP adjacent to each of the slopes SLP with each of the prisms PM interposed therebetween in the direction Y, and a height of each of the prisms PM interposed between each of the slopes SLP and each of the other slopes SLP increases as proceeding to the opposite side to the tip side in the direction Y. For example, the slopes SLP are disposed or formed such that the height thereof decreases as proceeding to the tip side in the direction Y.

In addition, for example, a plurality of pairs of two slopes SLP adjacent in the direction Y among the slopes SLP are disposed or formed such that a height of each of the pair of two slopes SLP decreases as proceeding toward the tip side in the direction Y.

Sizes (for example, lengths or areas) of the slopes SLP are set according to sizes (for example, lengths or areas) of the prisms PM, respectively. The lengths of the slopes SLP are set according to lengths (hereinafter, sometimes referred to simply as side lengths) of sides of the cross-sectional shapes of the prisms PM, respectively.

The slopes SLP are disposed or formed such that the sum of the length of each of the slopes SLP, the length of each of the other slopes SLP adjacent to each of the slopes SLP with each of the prisms PM interposed therebetween in the direction Y, and the length of the side of each of the prisms PM interposed between each of the slopes SLP and each of the other slopes SLP increases as proceeding to the opposite side to the tip side in the direction Y. For example, the slopes SLP are disposed or formed such that the length thereof decreases as proceeding to the tip side in the direction Y.

In addition, for example, a plurality of pairs of two slopes SLP adjacent in the direction Y among the slopes SLP are disposed or formed such that a length of each of the pair of two slopes SLP decreases as proceeding toward the tip side in the direction Y.

In the example shown in FIG. 4, the slopes SLP include a slope SLP1, a slope SLP2, a slope SLP3, a slope SLP4, a slope SLP5, and a slope SLP6. The slopes SLP1 to SLP6 are disposed in the described order on the tip side of the arrow in the direction Y.

Each of the slopes SLP1 to SLP6 is a slope angled at an angle $\theta 1$ toward the tip side and the lower side in the direction Y. In other words, each of the slopes SLP1 to SLP6 is a slope angled at the angle $\theta 1$ toward the side surface (opposite light incident surface) SF2 and the lower side.

The angle $\theta 1$ is, for example, an angle equal to or larger than an angle of the main ray of outgoing light incident on the light guide LG from the light incident surface SF1. In addition, the angle $\theta 1$ is desirably an angle at which the number of main rays in the normal direction with respect to the display panel PNL is maximized in relation to a prism shape, a material refractive index of the light guide LG, a material refractive index of the prism PM, and the like. Incidentally, heights of the slopes SLP1 to SLP6 may be different. Lengths of the slopes SLP1 to SLP6 may be different.

The slope SLP1 and the slope SLP2 correspond to a slope of a right triangle having an inclination angle $\theta 1$ and a height Sh1. In other words, the heights of the slope SLP1 and the slope SLP2 are the same. Incidentally, the heights of the slope SLP1 and the slope SLP2 may be different.

In addition, the lengths of the slope SLP1 and the slope SLP2 are the same. Incidentally, the lengths of the slope SLP1 and the slope SLP2 may be different. The slope SLP1 and the slope SLP2 are disposed at the position Ps1.

In other words, the slope SLP1 and the slope SLP2 are disposed to be spaced apart in the direction Y at the position Ps1. The slope SLP1 and the slope SLP2 are adjacent to each other with the position Ps1 interposed therebetween.

The slope SLP2 is located on the tip side of the arrow in the direction Y with respect to the slope SLP1. In other words, the slope SLP2 is located closer to the side surface SF2 than the slope SLP1 in the direction Y. The slope SLP2 is located on the opposite side to the tip side of the arrow in the direction Z with respect to the slope SLP1.

In other words, the slope SLP2 is disposed on the lower side of the slope SLP1. In other words, a thickness of the light guide LG corresponding to the slope SLP2 is larger than a thickness of the light guide LG corresponding to the slope SLP1.

The slope SLP3 and the slope SLP4 correspond to a slope of a right triangle having the inclination angle $\theta 1$ and a height Sh2. In other words, the heights of the slope SLP3 and the slope SLP4 are the same. Incidentally, the heights of the slope SLP3 and the slope SLP4 may be different.

In addition, the lengths of the slope SLP3 and the slope SLP4 are the same. Incidentally, the lengths of the slope SLP3 and the slope SLP4 may be different. The lengths of the slope SLP3 and the slope SLP4 are smaller than the lengths of the slope SLP1 and the slope SLP2.

The slope SLP3 and the slope SLP4 are disposed at the position Psc. In other words, the slope SLP3 and the slope SLP4 are disposed to be spaced apart in the direction Y at the position Psc. The slope SLP3 and the slope SLP4 are adjacent to each other with the position Psc interposed therebetween.

The slope SLP3 is located on the tip side of the arrow in the direction Y with respect to the slope SLP2. In other words, the slope SLP3 is located closer to the side surface SF2 than the slope SLP2 in the direction Y. The slope SLP3 is located on the opposite side to the tip side of the arrow in the direction Z with respect to the slope SLP2.

In other words, the slope SLP3 is disposed on the lower side of the slope SLP2. In other words, a thickness of the light guide LG corresponding to the slope SLP3 is larger than the thickness of the light guide LG corresponding to the slope SLP2.

The slope SLP4 is located on the tip side of the arrow in the direction Y with respect to the slope SLP3. In other words, the slope SLP4 is located closer to the side surface SF2 than the slope SLP3 in the direction Y. The slope SLP4 is located on the opposite side to the tip side of the arrow in the direction Z with respect to the slope SLP3.

In other words, the slope SLP4 is disposed on the lower side of the slope SLP3. In other words, a thickness of the light guide LG corresponding to the slope SLP4 is larger than the thickness of the light guide LG corresponding to the slope SLP3.

The height Sh2 is smaller than the height Sh1. For example, the height Sh2 is ⅔ times the height Sh1.

The slope SLP5 and the slope SLP6 correspond to a slope of a right triangle having the inclination angle θ1 and a height Sh3. In other words, the heights of the slope SLP5 and the slope SLP6 are the same. Incidentally, the heights of the slope SLP5 and the slope SLP6 may be different.

In addition, the lengths of the slope SLP5 and the slope SLP6 are the same. Incidentally, the lengths of the slope SLP5 and the slope SLP6 may be different. The lengths of the slope SLP5 and the slope SLP6 are smaller than the lengths of the slope SLP3 and the slope SLP4.

The slope SLP5 and the slope SLP6 are disposed at the position Ps2. In other words, the slope SLP5 and the slope SLP6 are disposed at the position Ps2 to be spaced apart in the direction Y. The slope SLP5 and the slope SLP6 are adjacent to each other with the position Ps2 interposed therebetween.

The slope SLP5 is located on the tip side of the arrow in the direction Y with respect to the slope SLP4. In other words, the slope SLP5 is located closer to the side surface SF2 than the slope SLP4 in the direction Y. The slope SLP5 is located on the opposite side to the tip side of the arrow in the direction Z with respect to the slope SLP4. In other words, the slope SLP5 is disposed on the lower side of the slope SLP4.

In other words, a thickness of the light guide LG corresponding to the slope SLP5 is larger than the thickness of the light guide LG corresponding to the slope SLP4. The slope SLP6 is located on the tip side of the arrow in the direction Y with respect to the slope SLP5. In other words, the slope SLP6 is located closer to the side surface SF2 than the slope SLP5 in the direction Y. The slope SLP6 is located on the opposite side to the tip side of the arrow in the direction Z with respect to the slope SLP5. In other words, the slope SLP6 is disposed on the lower side of the slope SLP5. In other words, a thickness of the light guide LG corresponding to the slope SLP6 is larger than the thickness of the light guide LG corresponding to the slope SLP5.

The height Sh3 is smaller than the height Sh1 and the height Sh2. For example, the height Sh3 is ⅓ times the height Sh1.

The planes PLN reflect incident light so as to guide the light in the light guide LG, for example. The planes PLN are disposed or formed to be spaced apart on the tip side of the arrow in the direction Y. Each of the planes PLN is disposed or formed so as to be located on the opposite side to the tip side of the arrow in the direction Z as proceeding toward the tip side of the arrow in the direction Y.

The planes PLN are disposed in steps descending downward to be spaced apart in the direction Y. In other words, thicknesses of the light guides LG respectively corresponding to the planes PLN increase as proceeding to the tip side of the arrow in the direction Y.

Widths of the planes PLN in the direction Y may be the same or different. For example, the widths of the planes PLN in the direction Y may be set according to the heights of the two slopes SLP adjacent to each other on both sides in the direction Y and the heights of the prisms PM disposed on the planes PLN. In the example shown in FIG. 4, the planes PLN include a plane PLN1, a plane PLN2, and a plane PLN3. The planes PLN1 to PLN3 are disposed in the described order on the tip side of the arrow in the direction Y.

The plane PLN1 is located at the position Ps1. The plane PLN1 is interposed between the slopes SLP1 and SLP2. The slope SLP1, the plane PLN1, and the slope SLP2 are continuously disposed in the described order in the direction Y.

The plane PLN1 is connected to an end portion of the slope SLP1 on the tip side of the arrow in the direction Y, and is connected to an end portion of the slope SLP2 on the opposite side to the tip side of the arrow in the direction Y. The slope SLP1 is angled from the plane PLN1 to the opposite side to the tip side of the arrow in the direction Y and the upper side at the angle θ1 up to the height Sh1. The slope SLP2 is angled from the plane PLN1 to the tip side of the arrow in the direction Y and the lower side at the angle θ1 up to the height Sh1.

The plane PLN2 is located at the position Psc. The plane PLN2 is located on the lower side of the plane PLN1. In other words, a thickness of the light guide LG corresponding to the plane PLN2 is larger than a thickness of the light guide LG corresponding to the plane PLN1. The plane PLN2 is interposed between the slopes SLP3 and SLP4.

The slope SLP3, the plane PLN2, and the slope SLP4 are continuously disposed in the described order in the direction Y. The plane PLN2 is connected to an end portion of the slope SLP3 on the tip side of the arrow in the direction Y, and is connected to an end portion of the slope SLP4 on the opposite side to the tip side of the arrow in the direction Y.

The slope SLP3 is angled from the plane PLN2 to the opposite side to the tip side of the arrow in the direction Y and the upper side at the angle θ1 up to the height Sh2. The slope SLP4 is angled from the plane PLN2 to the tip side of the arrow in the direction Y and the lower side at the angle θ1 up to the height Sh2.

The plane PLN3 is located at the position Ps2. The plane PLN3 is located on the lower side of the plane PLN2. In other words, a thickness of the light guide LG corresponding to the plane PLN3 is larger than the thickness of the light guide LG corresponding to the plane PLN2. The plane PLN3 is interposed between the slopes SLP5 and SLP6.

The slope SLP5, the plane PLN3, and the slope SLP6 are continuously disposed in the described order in the direction Y. The plane PLN3 is connected to an end portion of the slope SLP5 on the tip side of the arrow in the direction Y, and is connected to an end portion of the slope SLP6 on the opposite side to the tip side of the arrow in the direction Y.

The slope SLP5 is angled from the plane PLN3 to the opposite side to the tip side of the arrow in the direction Y and the upper side at the angle θ1 up to the height Sh3. The slope SLP6 is angled from the plane PLN3 to the tip side of the arrow in the direction Y and the lower side at the angle θ1 up to the height Sh3.

The prisms PM are disposed or formed on the planes PLN, respectively. The prisms PM are formed to contribute to, for example, outgoing light and return light. Incidentally, for example, the prisms PM may be formed so as to contribute to only one of the outgoing light and the return light.

The height of the prism PM is set according to the heights of the two slopes SLP adjacent to both sides of the plane PLN on which the prism PM is disposed in the direction Y. In other words, the height of the prism PM is set according to the heights of the two slopes SLP adjacent to each other with the prism PM interposed therebetween in the direction Y. The prisms PM are disposed or formed such that the height increases as proceeding toward the tip side of the arrow in the direction Y.

In addition, the prisms PM are disposed or formed such that the sum of the height of each of the prisms PM and heights of each pair of two slopes SLP adjacent to both sides of each of the prisms PM in the direction Y increases as proceeding to the opposite side of the tip side in the direction Y.

In other words, the prisms PM are disposed or formed such that the sum of the height of each of the prisms PM and the heights of each pair of the two slopes SLP adjacent to each other with each of the prisms PM interposed therebetween in the direction Y increases as proceeding to the opposite side to the tip side in the direction Y.

The length of the side of the prism PM is set according to the lengths of the two slopes SLP adjacent to both sides of the plane PLN on which the prism PM is disposed in the direction Y. In other words, the length of the side of the prism PM is set according to the lengths of the two slopes SLP adjacent to each other with the prism PM interposed therebetween in the direction Y.

The prisms PM are disposed or formed such that the length of the side increases as proceeding toward the tip side of the arrow in the direction Y. In addition, the prisms PM are disposed or formed such that the sum of the length of the side of each of the prisms PM and lengths of each pair of the two slopes SLP adjacent to both sides of each of the prisms PM in the direction Y increases as proceeding to the opposite side to the tip side in the direction Y.

In other words, the prisms PM are disposed or formed such that the sum of the length of the side of each of the prisms PM and the lengths of each pair of the two slopes SLP adjacent to each other with each of the prisms PM interposed therebetween in the direction Y increases as proceeding to the opposite side of the tip side in the direction Y.

In the example shown in FIG. 4, the prism PM1 is disposed on the plane PLN1. A cross-sectional shape of the prism PM1 is an isosceles triangle (inverted triangle) in which two base angles are angled at the angle θ1 with respect to the plane PLN1 and a height is a height Ph1. A vertex of the cross-sectional shape of the prism PM1 is located at the position Ps1.

For example, the height Ph1 is smaller than the height Sh1. For example, the height Ph1 is ⅓ times the height Sh1. For example, a length of a side of the prism PM1 is smaller than a length of the slope SLP1.

The length of the side of the prism PM1 is, for example, the same as lengths of the slopes SLP5 and SLP6. Incidentally, the prism PM1 is not necessarily disposed on the plane PLN1. The height Ph1 may be larger than the height Sh1. Alternatively, the length of the side of the prism PM1 may be larger than the length of the slope SLP1.

The prism PM2 is disposed on the plane PLN2. A cross-sectional shape of the prism PM2 is an isosceles triangle (inverted triangle) in which two base angles are angled at the angle θ1 with respect to the plane PLN2 and a height is a height Ph2. A vertex of the cross-sectional shape of the prism PM2 is located at the position Psc.

The height Ph2 is larger than the height Ph1. For example, the height Ph2 is twice the height Ph1. For example, the height Ph2 is the same as the height Sh2.

A length of a side of the prism PM2 is larger than the length of the side of the prism PM1. For example, the length of the side of the prism PM2 is the same as lengths of the slope SLP3 and the slope SLP4. Incidentally, in a case where the prism PM1 is not disposed on the plane PLN1, the prism PM2 is not necessarily disposed on the plane PLN2. Alternatively, the height Ph2 is not necessarily the same as the height Ph2.

The prism PM3 is disposed on the plane PLN3. A cross-sectional shape of the prism PM3 is an isosceles triangle (inverted triangle) in which two base angles are angled at the angle θ1 with respect to the plane PLN3 and a height is a height Ph3. A vertex of the cross-sectional shape of the prism PM3 is located at the position Ps2.

The height Ph3 is larger than the height Ph1 and the height Ph2. For example, the height Ph3 is three times the height Ph1. The height Ph3 is 3/2 times the height Ph2. For example, the height Ph3 is larger than the height Sh3. For example, the height Ph3 is three times the height Sh3.

A length of a side of the prism PM3 is larger than the length of the side of the prism PM2. For example, the length of the side of the prism PM3 is the same as the lengths of the slope SLP1 and the slope SLP2. Incidentally, in a case where the prisms PM1 and PM2 are not disposed on the plane PLN1 and the plane PLN2, respectively, the prism PM3 is not necessarily disposed on the plane PLN3. Alternatively, the height Ph3 may be smaller than the height Sh3.

Figure 5:
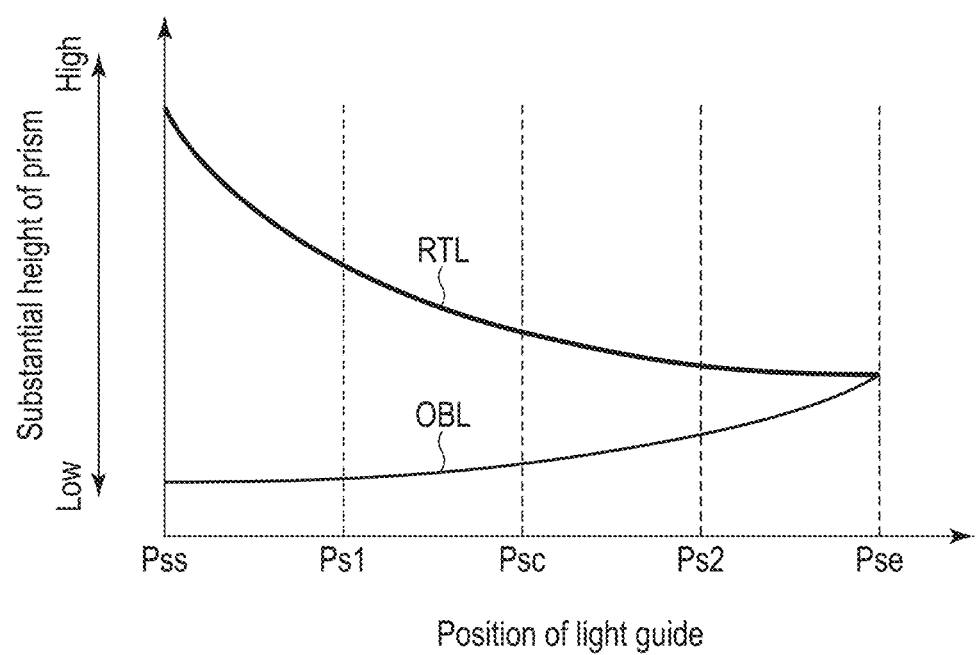
FIG. 5 is a schematic view showing an example of a change in a substantial height of the prism with respect to a position of a light guide according to the first embodiment.

FIG. 5 is a schematic view showing an example of a change in a substantial height of the prism PM with respect to a position of the light guide LG according to the present embodiment. In FIG. 5, the horizontal axis represents the position of the light guide LG in the direction Y (hereinafter, sometimes also referred to as "POSITION OF LIGHT GUIDE"), and the vertical axis represents a substantial height of the prism PM (hereinafter, sometimes also referred to as "SUBSTANTIAL HEIGHT OF PRISM").

A substantial height of prism corresponds to a height of a configuration contributing to outgoing light with respect to the outgoing light. A substantial height of prism corresponds to a height of a configuration contributing to return light with respect to the return light. In the present embodiment, a substantial height of prism corresponds to a height of the prism PM contributing to outgoing light with respect to the outgoing light. With respect to return light, a substantial height of prism corresponds to the sum of a height of the prism PM contributing to the return light and heights of two slopes adjacent to each other with the prism PM interposed therebetween in the direction Y.

In the horizontal axis of FIG. 5, a position of the light guide LG is a position proceeding toward the side surface SF2 of the light guide LG in a direction of a tip of an arrow. A position of the light guide LG is a position proceeding toward the side surface SF1 of the light guide LG in a direction on the opposite side to the tip of the arrow.

The horizontal axis in FIG. 5 indicates the position Pss, the position Ps1, the position Psc, the position Ps2, and the position Pse. In the vertical axis of FIG. 5, the substantial height of prism increases in a direction of the tip of the arrow toward "HIGH" and decreases in a direction of the tip of the arrow toward "LOW".

FIG. 5 shows a change OBL in the substantial height of prism with respect to the position of the light guide LG corresponding to outgoing light (hereinafter, sometimes also referred to as the change in the substantial height of prism corresponding to the outgoing light), and a change RTL in the substantial height of prism with respect to the position of the light guide LG corresponding to the return light (hereinafter, sometimes also referred to as a change in the substantial height pf prism corresponding to the return light).

The change OBL in the substantial height of prism corresponding to the outgoing light corresponds to a change in a height of the prism PM with respect to the outgoing light incident on the light guide LG from the side surface SF1 in the direction Y of the light guide LG. The change RTL in the substantial height of prism corresponding to the return light corresponds to a change in the sum of a height of each of the prisms PM with respect to the return light reflected by the side surface SF2 and heights of the two slopes SLP adjacent to each other with the prism PM interposed therebetween in the direction Y, in the direction Y of the light guide LG.

As shown in FIG. 5, the change OBL in the substantial height of prism corresponding to the outgoing light increases from the position Pss toward the position Pse in the light guide LG of the present embodiment. In other words, the prisms PM are provided on the opposing surface 1B of the light guide LG such that the height increases as proceeding toward the tip side of the arrow in the direction Y.

As shown in FIG. 5, the change RTL in the substantial height of prism corresponding to the return light increases from the position Pse toward the position Pss in the light guide LG of the present embodiment. In other words, the prisms PM and the slopes SLP are provided on the opposing surface 1B of the light guide LG such that the sum of the height of each of the prisms PM and heights of the two slopes SLP adjacent to each other with the prism PM interposed therebetween in the direction Y increases as proceeding to the opposite side to the tip side of the arrow in the direction Y.

In general, light emission on a side close to the light incident surface SF1 is suppressed in the light guide LG, and the light emission can be increased on a side far from the light incident surface SF1. In the light guide LG of the present embodiment described above, the prism PM can contribute to light emission of the outgoing light, and the prism PM and the slope SLP can contribute to light emission of the return light.

In the light guide LG shown in FIG. 4, the outgoing light is actively emitted from a point on the tip side of the arrow in the direction Y where light mixing is sufficiently performed because there is a risk of insufficient light mixing. For this reason, a luminance deviation in both the direction Y and the direction X can be suppressed according to the light guide LG of the present embodiment.

According to the present embodiment, the illumination device IL includes the light guide LG, the light sources LS, the reflective layer RF, and the prisms PM. The light guide LG includes the main surface 1A located on a side close to the display panel PNL, the opposing surface 1B located on the opposite side of the main surface 1A in the direction Z, the side surface SF1, and the side surface SF2 located on the opposite side of the side surface SF1 in the direction Y.

The side surface SF1 and the side surface SF2 are opposed to each other in the direction Y. The main surface 1A extends parallel to the direction Y. The opposing surface 1B has the slopes SLP and the planes PLN. The slopes SLP are angled at the angle θ1 to the tip side of the arrow in the direction Y and the lower side.

The slopes SLP are disposed or formed such that the height and the length decrease as proceeding toward the tip side of the arrow in the direction Y. The planes PLN are connected to two slopes SLP adjacent to each other on both sides in the direction Y.

The cross-sectional shapes of the prisms PM are the isosceles triangle (inverted triangle) having the same two base angles θ1 as the inclination angle θ1 of the slope SLP. The prisms PM are disposed on the planes PLN, respectively. For example, the prisms PM are disposed or formed such that the height and the length of the side increase as proceeding toward the tip side of the arrow in the direction Y.

The prisms PM and the slopes SLP are formed or disposed such that the sum of the height and the side length of each of the prisms PM and the heights and the lengths of a plurality of pairs of two slopes SLP adjacent in the direction Y with each of the prisms PM interposed therebetween increases as proceeding to the opposite side to the tip side of the arrow in the direction Y.

The light sources LS are opposed to the side surface SF1. The light source LS emits light to the side surface SF1. In the light guide LG of the present embodiment, the prism PM can contribute to light emission of the outgoing light, and the prism PM and the slope SLP can contribute to light emission of the return light. The outgoing light is actively emitted from a point on the tip side of the arrow in the direction Y where light mixing is sufficiently performed because there is a risk of insufficient light mixing. For this reason, a luminance deviation in both the direction Y and the direction X can be suppressed according to the light guide LG of the present embodiment.

The illumination device IL includes one light guide LG, and thus, can be reduced in thickness. In addition, the illumination device IL can secure in-plane luminance uniformity. Therefore, the illumination device IL can improve the luminance uniformity. In other words, the display device DSP can also improve the luminance uniformity.

Next, a display device DSP and an illumination device IL according to a modified example of the first embodiment and other embodiments will be described. In the modified examples and the other embodiments to be described below, parts identical to those of the display device DSP and the illumination device IL of the first embodiment described above are denoted by the identical reference signs, and the detailed description thereof is omitted or simplified. The detailed description is given focusing on parts different from those of the display device DSP and the illumination device IL of the first embodiment. Incidentally, effects similar to those of the above-described embodiment can be also obtained in the other modified examples and the other embodiments.

Modified Example 1

An illumination device IL according to Modified Example 1 of the first embodiment is different from the illumination device IL of the first embodiment in terms of a configuration of a light guide LG.

Figure 6:
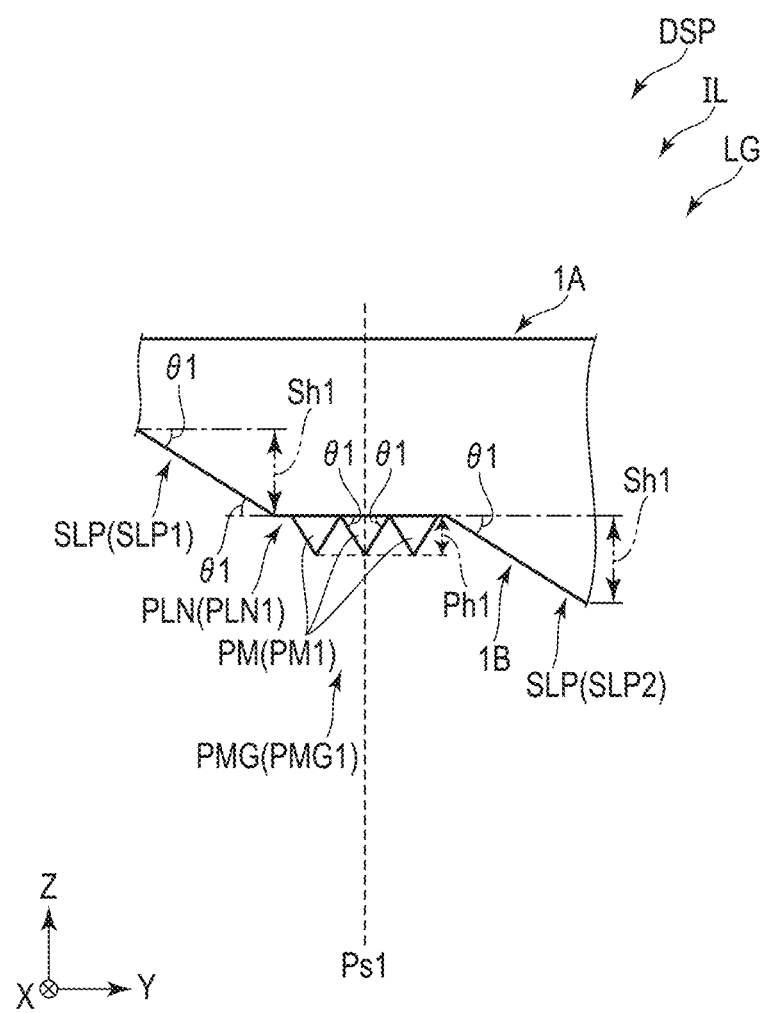
FIG. 6 is a cross-sectional view showing an arrangement example of a prism according to Modified Example 1.

FIG. 6 is a cross-sectional view showing an arrangement example of a prism PM according to Modified Example 1. FIG. 6 shows Only a Configuration Necessary for the Description.

A plurality of prism groups PMG are disposed on the lower side of the light guide LG to be spaced apart in the direction Y. In other words, the prism groups PMG are disposed to be spaced apart in the direction Y on an opposing surface 1B of the light guide LG. The prism groups PMG are disposed or formed on a plurality of planes PLN, respectively.

The prism groups PMG include a plurality of the prisms PM. Each of the prism groups PMG includes, for example, the prisms PM continuously arranged in the direction Y. Incidentally, each of the prism groups PMG may include, for example, the prisms PM arranged to be spaced apart in the direction Y.

A height of the prism group PMG is set according to heights of two slopes SLP adjacent to both sides of the plane PLN on which the prism group PMG is disposed in the direction Y. In other words, the height of the prism group PMG is set according to the heights of the two slopes SLP adjacent to each other with the prism group PMG interposed therebetween in the direction Y. For example, the height of the prism group PMG corresponds to the sum of heights of the prisms PM included in the prism group PMG.

The prism groups PMG are disposed or formed such that the height thereof increases as proceeding to a tip side of an arrow in a direction Y. In addition, the prism groups PMG are disposed or formed such that the sum of the height of each of the prism groups PMG and heights of each pair of two slopes SLP adjacent to both sides of each of the prism groups PMG in the direction Y increases as proceeding to the opposite side of the tip side in the direction Y.

In other words, the prism groups PMG are disposed or formed such that the sum of the height of each of the prism groups PMG and heights of each pair of two slopes SLP adjacent to each other with each of the prism groups PMG interposed therebetween in the direction Y increases as proceeding to the opposite side of the tip side in the direction Y.

A length of a side of the prism group PMG is set according to lengths of two slopes SLP adjacent to both sides of the plane PLN on which the prism group PMG is disposed in the direction Y. In other words, the length of the side of the prism group PMG is set according to the lengths of the two slopes SLP adjacent to each other with the prism group PMG interposed therebetween in the direction Y. For example, the length of the side of the prism group PMG corresponds to the sum of lengths of sides of the prisms PM included in the prism group PMG.

The prism groups PMG are disposed or formed such that the length of the side thereof increases as proceeding toward the tip side of the arrow in the direction Y. In addition, the prism groups PMG are disposed or formed such that the sum of the length of the side of each of the prism groups PMG and lengths of each pair of two slopes SLP adjacent to both sides of each of the prism groups PMG in the direction Y increases as proceeding to the opposite side of the tip side in the direction Y.

In other words, the prism groups PMG are disposed or formed such that the sum of the length of the side of each of the prism groups PMG and lengths of each pair of two slopes SLP adjacent to each other with each of the prism groups PMG interposed therebetween in the direction Y increases as proceeding to the opposite side of the tip side in the direction Y.

In the example shown in FIG. 6, the prism group PMG includes a prism group PMG1. The prism group PMG1 is disposed on a plane PLN1. The prism group PMG1 includes three prisms PM1. Incidentally, the prism group PMG1 may include two prisms PM1 or may include four or more prisms PM1.

The prism group PMG1 includes three prisms PM1 continuously arranged in the direction Y. Incidentally, the prism group PMG1 may include three prisms PM1 arranged to be spaced apart in the direction Y. Alternatively, the prism group PMG1 may include a plurality of prisms PM having different heights in a similar relationship.

Heights of the slopes SLP is set according to the heights of the prism groups PMG, respectively. The slopes SLP are disposed or formed such that the sum of a height of each of the slopes SLP, a height of each of the other slopes SLP adjacent to each of the slopes SLP with each of the prism groups PMG interposed therebetween in the direction Y, and a height of each of the prism groups PMG interposed between each of the slopes SLP and each of the other slopes SLP increases as proceeding to the opposite side to the tip side in the direction Y.

Modified Example 1 configured as above also has effects similar to those of the first embodiment.

Modified Example 2

An illumination device IL according to Modified Example 2 of the first embodiment is different from the illumination devices IL according to the first embodiment and Modified Example 1 in terms of a configuration of a light guide LG.

Figure 7:
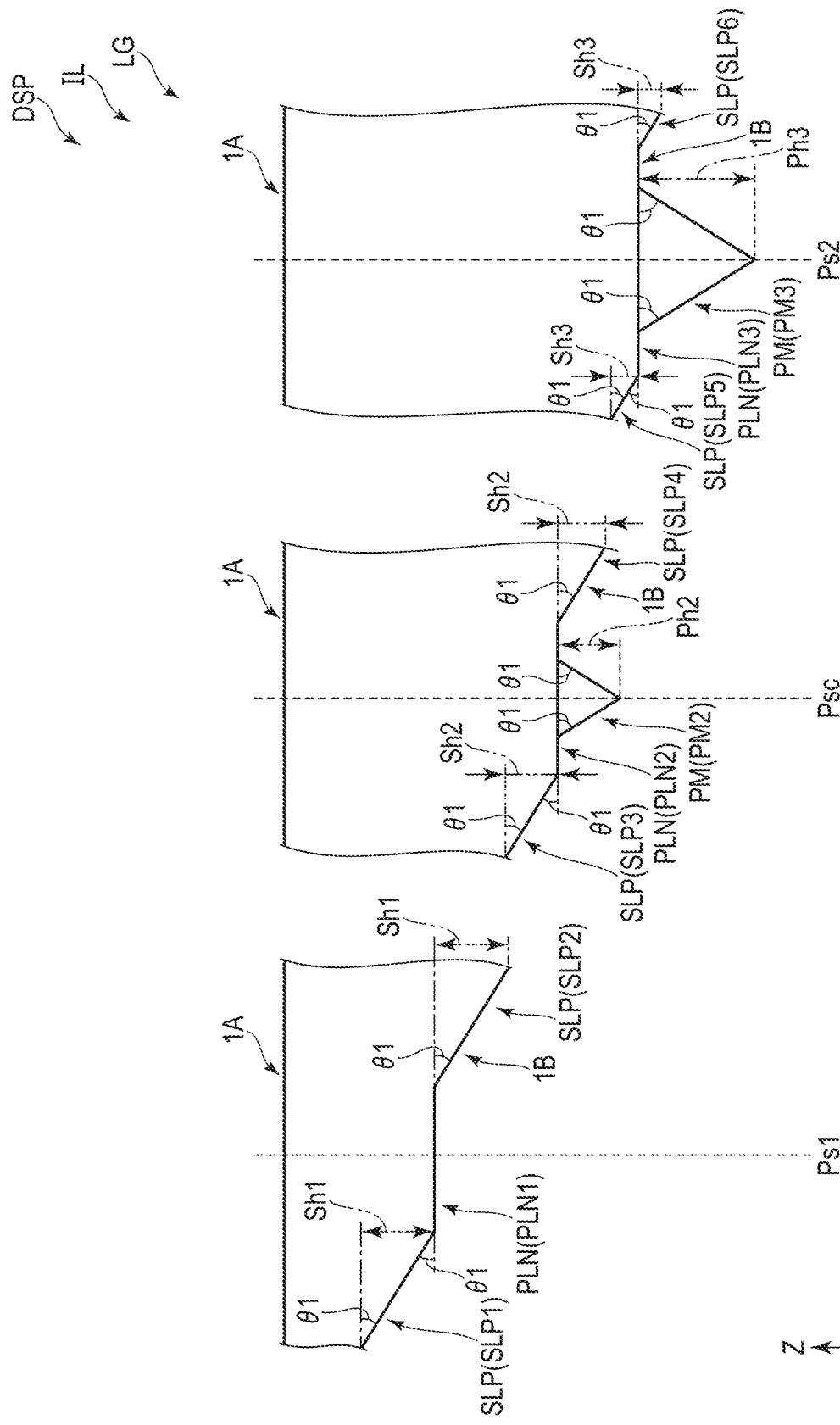
FIG. 7 is a cross-sectional view showing an arrangement example of a prism according to Modified Example 2.

FIG. 7 is a cross-sectional view showing an arrangement example of a prism PM according to Modified Example 2. FIG. 7 shows only a configuration necessary for the description.

Planes PLN include a plane PLN on which the prism PM or a prism group PMG is disposed and a plane PLN on which the prism PM or the prism group PMG is not disposed.

In the example shown in FIG. 7, a prism PM2 is disposed on a plane PLN2. The prism PM3 is disposed on the plane PLN3. No prism PM is disposed on a plane PLN1. Incidentally, the prism PM2 is not necessarily disposed since no prism PM is disposed on the plane PLN1. Alternatively, in a case where the prism PM2 is not disposed on the plane PLN2, the prism PM3 is not necessarily disposed on the plane PLN3.

Modified Example 2 configured as above also has effects similar to those of the first embodiment.

Second Embodiment

A display device DSP according to a second embodiment is different from the display devices DSP of the first embodiment, Modified Example 1, and Modified Example 2 in terms of a configuration of a light guide LG of an illumination device IL.

Figure 8:
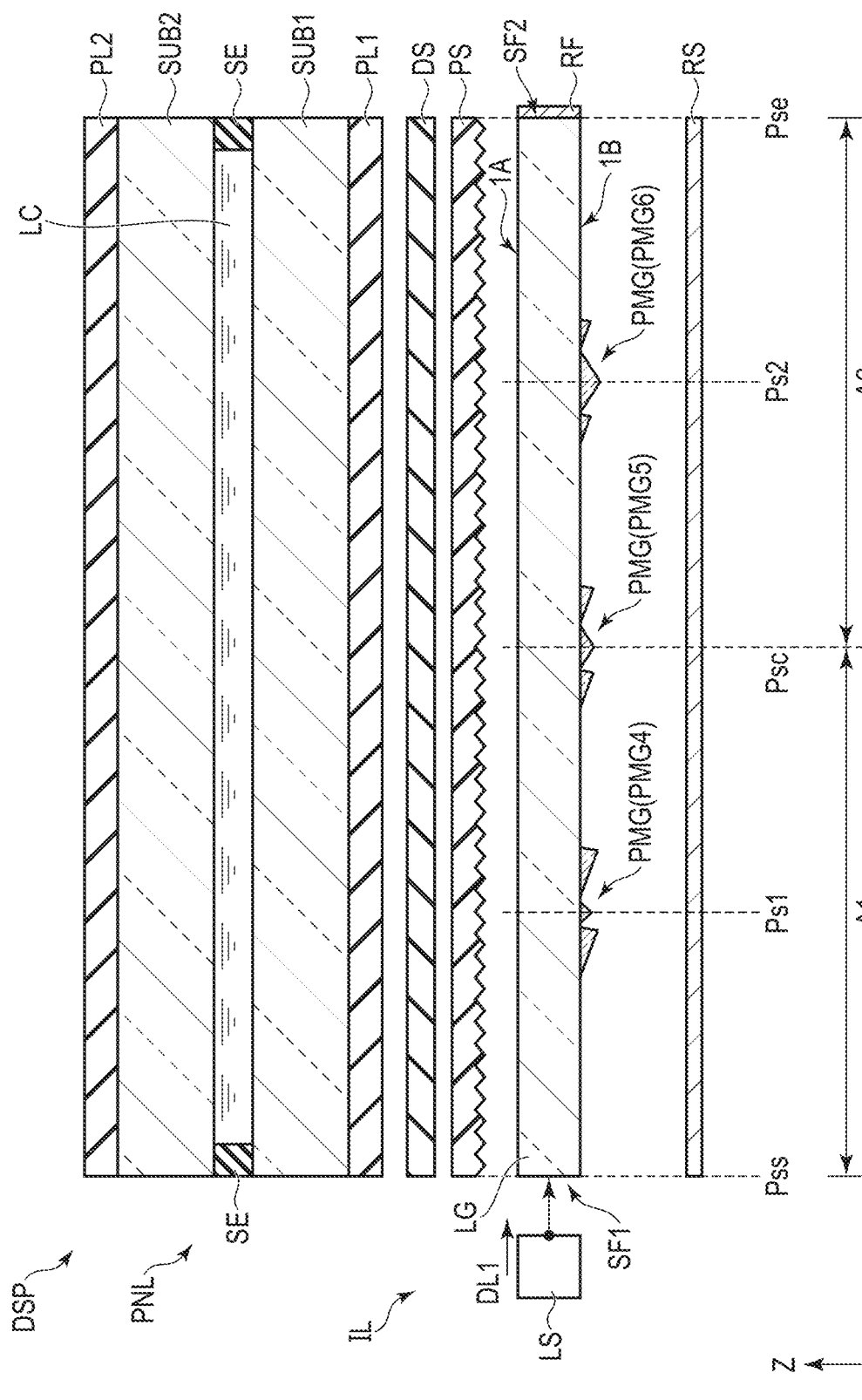
FIG. 8 is a cross-sectional view of a display device according to a second embodiment.

FIG. 8 is a cross-sectional view of the display device DSP according to the second embodiment.

In the example shown in FIG. 8, the light guide LG has the same thickness in the direction Y. In the light guide LG, an opposing surface 1B is parallel to a main surface 1A.

A plurality of prism groups PMG are disposed on the lower side of the light guide LG to be spaced apart in the direction Y. In other words, the prism groups PMG are disposed to be spaced apart in the direction Y on an opposing surface 1B of the light guide LG.

The prism group PMG includes at least one prism (hereinafter, sometimes also referred to as outgoing/return path prism) PM formed to contribute to outgoing light and return light, and at least one prism (hereinafter, sometimes also referred to as return path prism) PM formed to contribute only to the return light.

In the example shown in FIG. 8, the prism group PMG includes a prism group PMG4, a prism group PMG5, and a prism group PMG6. Incidentally, the prism group PMG may include four or more prism groups, or may include two or less prism groups PMG.

The prism group PMG4, the prism group PMG5, and the prism group PMG6 are disposed on the lower side of the light guide LG to be spaced apart in the direction Y. In other words, the prism group PMG4, the prism group PMG5, and the prism group PMG6 are disposed to be spaced apart in the direction Y on the opposing surface 1B of the light guide LG.

The prism group PMG4 is disposed at a position Ps1 of the light guide LG. The prism group PMG5 is disposed at a position Psc of the light guide LG. The prism group PMG6 is disposed at a position Ps2 of the light guide LG. Incidentally, the prism groups PMG may be disposed at predetermined positions of the light guide LG in the direction Y other than the position Ps1, the position Psc, and the position Ps2.

Figure 9:
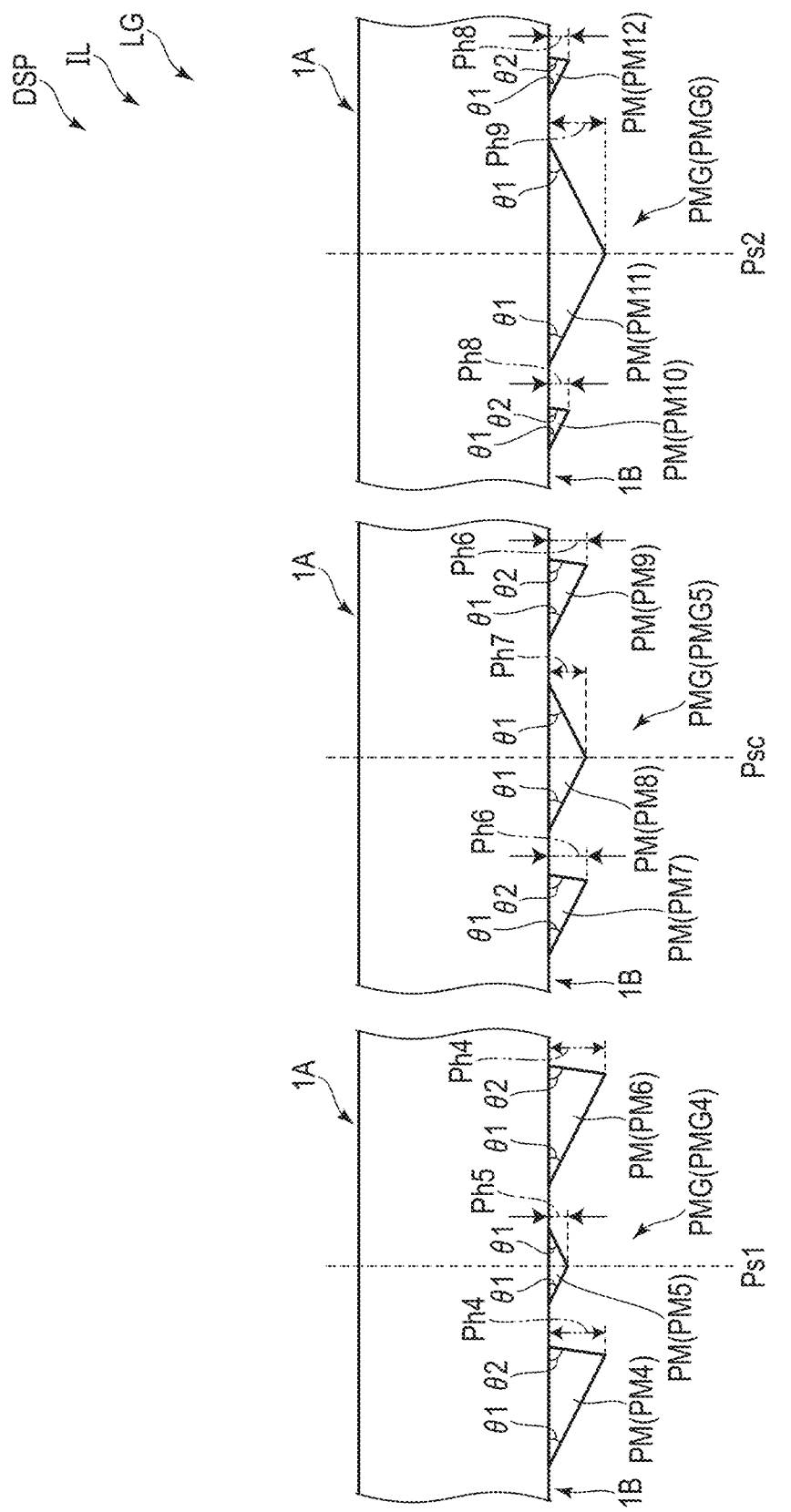
FIG. 9 is a cross-sectional view showing an arrangement example of a prism group according to the second embodiment.

FIG. 9 is a cross-sectional view showing an arrangement example of the prism group PMG according to the second embodiment. FIG. 9 shows only a configuration necessary for the description.

A height of the outgoing/return path prism PM is set according to a height of another prism PM in each of the prism groups PMG. The outgoing/return path prisms PM respectively included in the prism groups PMG are disposed or formed such that the height thereof increases as proceeding toward a tip side of an arrow in a direction Y. In addition, the prism groups PMG are disposed or formed such that the height thereof increases as proceeding to the opposite side to the tip side of the arrow in the direction Y.

In other words, the prism groups PMG are disposed or formed such that the sum of the height of the at least one outgoing/return path prism PM and a height of the at least one return path prism PM increases as proceeding to the opposite side to the tip side of the arrow in the direction Y.

A length of a side of the outgoing/return path prism PM is set according to a length of a side of another prism PM in each of the prism groups PMG. The outgoing/return path prisms PM are disposed or formed such that the length of the side thereof increases as proceeding toward the tip side of the arrow in the direction Y. In addition, the prism groups PMG are disposed or formed such that a length of a side thereof increases as proceeding to the opposite side to the tip side of the arrow in the direction Y.

In other words, the prism groups PMG are disposed or formed such that the sum of the length of the side of the at least one outgoing/return path prism PM and a length of a side of the at least one return path prism PM increases as proceeding to the opposite side to the tip side of the arrow in the direction Y.

In the example shown in FIG. 9, the prism group PMG4 is disposed at the position Ps1. The prism group PMG4 includes a prism PM4, a prism PM5, and a prism PM6. The prism PM4, the prism PM5, and the prism PM6 are continuously arranged in the described order on the tip side of the arrow in the direction Y in the prism group PMG4.

The prism PM5 is disposed to be spaced apart on the tip side of the arrow in the direction Y from the prism PM4. The prism PM6 is disposed to be spaced apart on the tip side of the arrow in the direction Y from the prism PM5.

In other words, the prism PM5 is disposed on a side closer to a side surface SF2 than the prism PM4 with an interval in the direction Y. The prism PM6 is disposed on a side closer to the side surface SF2 than the prism PM5 with an interval in the direction Y. Incidentally, the prism PM5 may be continuously disposed on the tip side of the arrow in the direction Y of the prism PM4. The prism PM6 may be continuously disposed on the tip side of the arrow in the direction Y of the prism PM5.

In other words, the prism PM5 may be continuously disposed on the side closer to the side surface SF2 of the prism PM4 in the direction Y. The prism PM6 may be continuously disposed on the side closer to the side surface SF2 of the prism PM5 in the direction Y. The prism PM5 is located between the prisms PM4 and PM6 in the direction Y in the prism group PMG4. The prisms PM4 and PM6 correspond to return path prisms. The prism PM5 corresponds to an outgoing/return path prism.

A cross-sectional shape of each of the prisms PM4 and PM6 has a vertex where a side (first long side) angled to the tip side and the lower side of the arrow in the direction Y at an angle $\theta 1$ with respect to the opposing surface 1B intersects a side (first short side) angled to the opposite side of the tip side of the arrow in the direction Y and the lower side at an angle $\theta 2$ larger than the angle $\theta 1$ with respect to the opposing surface 1B. The cross-sectional shapes of the prism PM4 and the prism PM6 are triangles (inverted triangles) having a height Ph4.

In other words, the cross-sectional shape of each of the prism PM4 and the prism PM6 is the triangle (inverted triangle) having the vertex where the first long side intersects the first short side and having the height Ph4. The first long side is located on a side closer to a light incident surface SF1 than the first short side, and is angled toward the first short side at the angle $\theta 1$ with respect to the opposing surface 1B. The first short side is located on a side closer to an opposite light incident surface SF2 than the first long side, and is angled toward the first long side at the angle $\theta 2$ with respect to the opposing surface 1B.

The angle $\theta 2$ is larger than the angle $\theta 1$. The angle $\theta 2$ is desirably 90° in order to reduce a luminance loss. A length of the first long side is larger than a length of the first short side. A cross-sectional shape of the prism PM5 is an isosceles triangle (inverted triangle) in which two base angles are angled at the angle $\theta 1$ with respect to the opposing surface 1B and a height is a height Ph5. A vertex of the cross-sectional shape of the prism PM5 is located at the position Ps1. For example, the height Ph4 is larger than the height Ph5. For example, the height Ph4 is three times the height Ph5.

The prism group PMG5 is disposed at a position Psc. The prism group PMG5 includes a prism PM7, a prism PM8, and a prism PM9. The prism PM7, the prism PM8, and the prism PM9 are continuously arranged in the described order on the tip side of the arrow in the direction Y. The prism PM8 is disposed to be spaced apart on the tip side of the arrow in the direction Y from the prism PM7, and the prism PM9 is disposed to be spaced apart on the tip side of the arrow in the direction Y from the prism PM8.

In other words, the prism PM8 is disposed on a side closer to a side surface SF2 than the prism PM7 with an interval in the direction Y. The prism PM9 is disposed on a side closer to the side surface SF2 than the prism PM8 with an interval in the direction Y. Incidentally, the prism PM8 may be continuously disposed on the tip side of the arrow in the direction Y of the prism PM7. The prism PM9 may be continuously disposed on the tip side of the arrow in the direction Y of the prism PM8.

In other words, the prism PM8 may be continuously disposed on the side closer to the side surface SF2 of the prism PM7 in the direction Y. The prism PM9 may be continuously disposed on the side closer to the side surface SF2 of the prism PM8 in the direction Y. The prism PM8 is located between the prisms PM7 and PM9 in the direction Y. The prisms PM7 and PM9 correspond to return path prisms. The prism PM8 corresponds to an outgoing/return path prism.

A cross-sectional shape of each of the prisms PM7 and PM9 is a triangle (inverted triangle) having a vertex where a side (second long side) angled to the tip side and the lower side of the arrow in the direction Y at an angle $\theta 1$ with respect to the opposing surface 1B intersects a side (second short side) angled to the opposite side of the tip side of the arrow in the direction Y and the lower side at an angle $\theta 2$ larger than the angle $\theta 1$ with respect to the opposing surface 1B and having a height Ph6.

In other words, the cross-sectional shape of each of the prism PM7 and the prism PM9 is the triangle (inverted triangle) having the vertex where the second long side intersects the second short side and having the height Ph6. The second long side is located on a side closer to the light incident surface SF1 than the second short side, and is angled toward the second short side at the angle $\theta 1$ with respect to the opposing surface 1B. The second short side is located on a side closer to the opposite light incident surface SF2 than the second long side, and is angled toward the second long side at the angle $\theta 2$ with respect to the opposing surface 1B.

A length of the second long side is larger than a length of the second short side. The length of the second long side is smaller than the length of the first long side. In addition, the length of the second short side is smaller than the length of the first short side.

A cross-sectional shape of the prism PM8 is an isosceles triangle (inverted triangle) in which two base angles are angled at the angle $\theta 1$ with respect to the opposing surface 1B and a height is a height Ph7. A vertex of the cross-sectional shape of the prism PM8 is located at the position Psc.

For example, the height Ph6 is smaller than the height Ph4. For example, the height Ph6 is ⅔ times the height Ph4. The height Ph7 is larger than the height Ph5. For example, the height Ph7 is twice the height Ph5.

The sum of the heights of the prisms PM7 to PM9 (2×Ph6+Ph7) is smaller than the sum of the heights of the prisms PM4 to PM6 (2×Ph4+Ph5). In other words, the sum of the heights of the prisms PM4 to PM6 (2×Ph4+Ph5) is larger than the sum of the heights of the prisms PM7 to PM9 (2×Ph6+Ph7).

A length of equal sides of the prism PM8 is larger than a length of equal sides of the prism PM5. For example, the length of the equal side of the prism PM8 is twice the length of the equal side of the prism PM5, and is the same as the length of the second long side of each of the prisms PM7 and PM9.

The sum of the lengths of the two second long sides of the prisms PM7 and PM9 and the length of the equal side of the prism PM8 is smaller than the sum of the lengths of the two first long sides of the prisms PM4 and PM6 and the length of the equal side of the prism PM5.

In other words, the sum of the lengths of the two first long sides of prism PM4 and prism PM6 and the length of the equal side of prism PM5 is larger than the sum of the lengths of the two second long sides of prism PM7 and prism PM9 and the length of the equal side of prism PM8.

The prism group PMG6 is disposed at the position Ps2. The prism group PMG6 includes a prism PM10, a prism PM11, and a prism PM12. The prism PM10, the prism PM11, and the prism PM12 are continuously arranged in the described order on the tip side of the arrow in the direction Y. The prism PM11 is disposed to be spaced apart on the tip side of the arrow in the direction Y from the prism PM10. The prism PM12 is disposed to be spaced apart on the tip side of the arrow in the direction Y from the prism PM11.

In other words, the prism PM11 is disposed on a side closer to the side surface SF2 than the prism PM10 with an interval in the direction Y, and the prism PM12 is disposed on a side closer to the side surface SF2 than the prism PM11 with an interval in the direction Y. Incidentally, the prism PM11 may be continuously disposed on the tip side of the arrow in the direction Y of the prism PM10. The prism PM12 may be continuously disposed on the tip side of the arrow in the direction Y of the prism PM11.

In other words, the prism PM11 may be continuously disposed on the side closer to the side surface SF2 of the prism PM10 in the direction Y. The prism PM12 may be continuously disposed on the side closer to the side surface SF2 of the prism PM11 in the direction Y. The prism PM11 is located between the prisms PM10 and PM12 in the direction Y.

The prism PM10 and the prism PM12 correspond to return path prisms. The prism PM11 corresponds to an outgoing/return path prism. A cross-sectional shape of each of the prisms PM10 and PM12 is a triangle (inverted triangle) having a vertex where a side (third long side) angled to the tip side and the lower side of the arrow in the direction Y at an angle $\theta 1$ with respect to the opposing surface 1B intersects a side (third short side) angled to the opposite side of the tip side of the arrow in the direction Y and the lower side at an angle $\theta 2$ larger than the angle $\theta 1$ with respect to the opposing surface 1B and having a height Ph8.

In other words, the cross-sectional shape of each of the prism PM10 and the prism PM12 is the triangle (inverted triangle) having the vertex where the third long side intersects the third short side and having the height Ph8. The third long side is located on a side closer to the light incident surface SF1 than the third short side, and is angled toward the third short side at the angle $\theta 1$ with respect to the opposing surface 1B. The third short side is located on a side closer to the opposite light incident surface SF2 than the third long side, and is angled toward the third long side at the angle $\theta 2$ with respect to the opposing surface 1B.

A length of the third long side is larger than a length of the third short side. The length of the third long side is smaller than the length of the second long side. In addition, the length of the third short side is smaller than the length of the second short side.

A cross-sectional shape of the prism PM11 is an isosceles triangle (inverted triangle) in which two base angles are angled at the angle $\theta 1$ with respect to the opposing surface 1B and a height is a height Ph9. A vertex of the cross-sectional shape of the prism PM11 is located at the position Ps2.

For example, the height Ph8 is smaller than the height Ph4 and the height Ph6. For example, the height Ph8 is ⅓ times the height Ph4. For example, the height Ph8 is ½ times the height Ph6. The height Ph9 is larger than the height Ph5 and the height Ph7. For example, the height Ph9 is three times the height Ph5. For example, the height Ph9 is ½ times the height Ph7.

The sum of the heights of the prisms PM10 to PM12 (2×Ph8+Ph9) is smaller than the sum of the heights of the prisms PM7 to P9 (2×Ph6+Ph7). In other words, the sum of the heights of the prisms PM7 to P9 (2×Ph6+Ph7) is larger than the sum of the heights of the prisms PM10 to PM12 (2×Ph8+Ph9).

A length of equal sides of the prism PM11 is larger than the lengths of the equal sides of the prism PM5 and the prism PM8. For example, the length of the equal side of the prism PM11 is three times the length of the equal side of the prism PM5, and is three times the length of the third long side of each of the prism PM10 and the prism PM12.

The sum of the lengths of the two third long sides of the prism PM10 and the prism PM12 and the length of the equal side of the prism PM11 is smaller than the sum of the lengths of the two third long sides of the prism PM7 and the prism PM9 and the length of the equal side of the prism PM8.

In other words, the sum of the lengths of the two third long sides of the prism PM7 and the prism PM9 and the length of the equal side of the prism PM8 is larger than the sum of the lengths of the two third long sides of the prism PM10 and the prism PM12 and the length of the equal side of the prism PM11.

The configuration of the light guide LG shown in FIG. 9 enables the illumination device IL according to the second embodiment to reproduce changes OBL and RTL in substantial heights of the prisms PM with respect to positions of the light guide LG shown in FIG. 5.

According to the second embodiment, the illumination device IL includes the light guide LG, a plurality of light sources LS, a reflective layer RF, and the prism groups PMG. The light guide LG includes a main surface 1A located on a side close to a display panel PNL, an opposing surface 1B that is located on the opposite side of the main surface 1A in a direction Z and is parallel to the main surface 1A, the side surface SF1, and the side surface SF2 located on the opposite side of the side surface SF1 in the direction Y.

The prism groups PMG are disposed to be spaced apart in the direction Y on the opposing surface 1B. The prism group PMG includes at least one outgoing/return path prism PM formed to contribute to the outgoing light and the return light, and at least one return path prism formed to contribute only to the return light.

The outgoing/return path prisms PM respectively included in the prism groups PMG are disposed or formed such that a height and a length of a side thereof increase as proceeding toward the tip side of the arrow in the direction Y. In addition, the prism groups PMG are disposed or formed such that a height and a length of a side thereof increases as proceeding to the opposite side to the tip side of the arrow in the direction Y.

Therefore, the illumination device IL can improve the luminance uniformity. In other words, the display device DSP can also improve the luminance uniformity.

Third Embodiment

An illumination device IL according to a third embodiment is different from the illumination devices IL according to the first embodiment, Modified Example 1, Modified Example 2, and the second embodiment in terms of configurations of a light source LS and a light guide LG.

Figure 10:
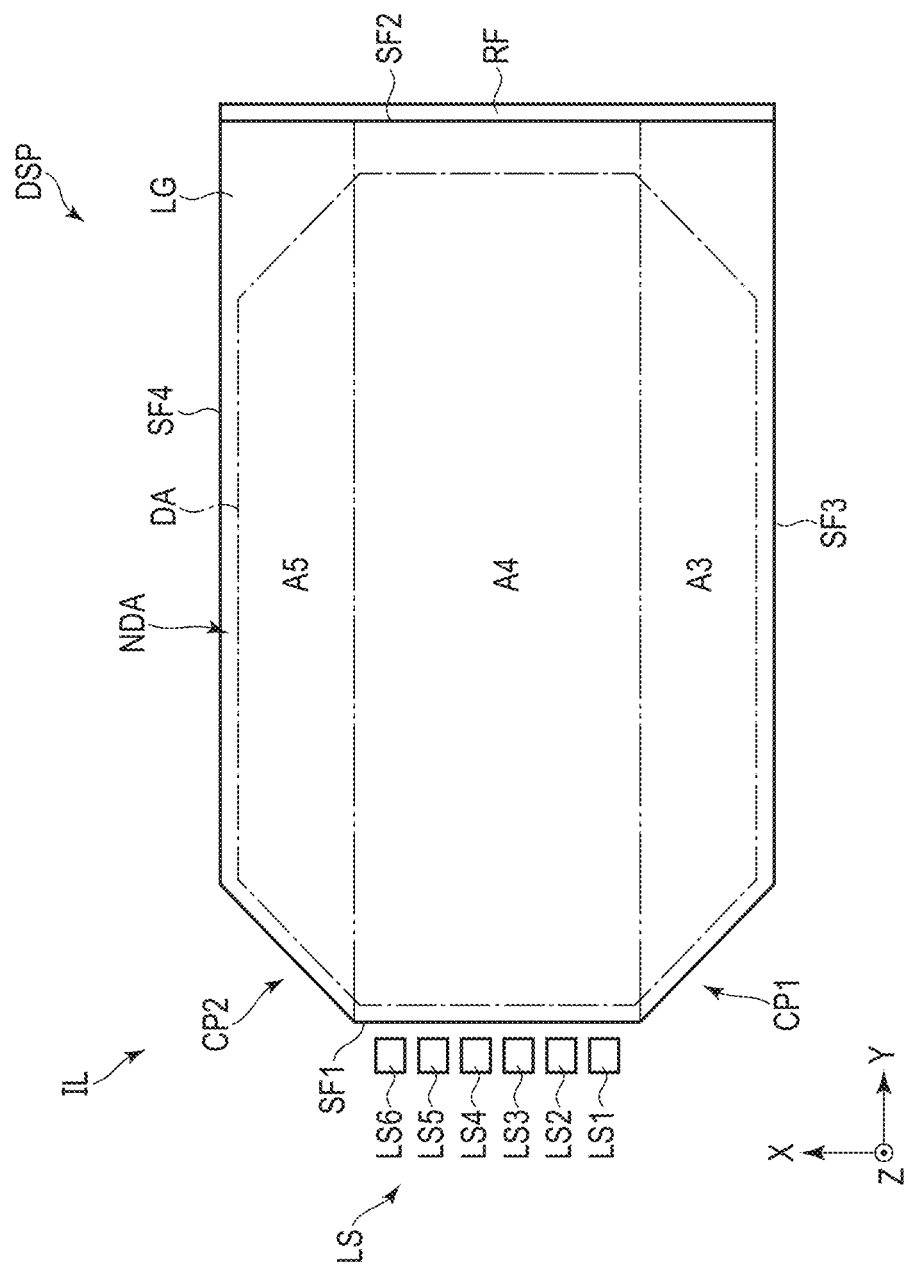
FIG. 10 is a plan view of an illumination device according to a third embodiment.

FIG. 10 is a plan view of the illumination device IL according to the third embodiment. As shown in FIG. 10, the illumination device IL according to the third embodiment includes a display region DA and a non-display region NDA. In the example shown in FIG. 10, the display region DA has an octagon shape. Incidentally, the display region DA may be formed in a shape other than the octagon shape.

In the example shown in FIG. 10, the light guide LG includes a third region A3, a fourth region A4, and a fifth region A5. The third region A3, the fourth region A4, and the fifth region A5 are continuously arranged in the described order on a tip side of an arrow in a direction X.

The third region A3 corresponds to a region of an end portion on the opposite side to the tip side of the arrow in the direction X. The fifth region A5 corresponds to a region of an end portion on the tip side of the arrow in the direction X. The fourth region A4 corresponds to a region between the third region A3 and the fifth region A5 in the direction X. The fourth region A4 is located at the center (or the inner side) in the direction X, and the third region A3 and the fifth region A5 are located at the end portions (or the outer side) in the direction X.

In the example shown in FIG. 10, the light guide LG includes a side surface SF1, a side surface SF2 opposed to the side surface SF1, a side surface SF3 intersecting the side surface SF2, a side surface SF4 that intersects the side surface SF2 and is opposed to the side surface SF3, a slope CP1 connecting the side surface SF1 and the side surface SF3, and a slope CP2 connecting the side surface SF1 and the side surface SF4.

The light guide LG is formed in a hexagon shape having two notches formed by cutting out two corner portions on the opposite side to a tip side of an arrow in a direction Y from a rectangle in planar view. For example, the light guide LG is formed in a hexagon shape having the slopes CP1 and CP2 formed by cutting out two corner portions on the opposite side to the tip side of the arrow in the direction Y from a rectangle in planar view.

Incidentally, the light guide LG may be formed in a shape other than the hexagon shape in planar view. For example, the light guide LG may have a shape including a recess having a radius (R) (curvature) formed by cutting out at least one corner portion of two corner portions on the opposite side to the tip side of the arrow in the direction Y from a rectangle in planar view.

A length of the side surface SF1 in the direction X is shorter than a length of the side surface SF2 in the direction X. The side surface SF1 corresponds to, for example, an end surface on the opposite side to the tip side of the arrow in the direction Y of the fourth region A4. Incidentally, the side surface SF1 may correspond to, for example, an end surface on the opposite side to the tip side of the arrow in the direction Y of a region other than the fourth region A4.

The side surface SF2 corresponds to, for example, an end surface on the tip side of the arrow in the direction Y of the third region A3 to the fifth region A5. Incidentally, the side surface SF2 may correspond to, for example, an end surface on the tip side of the arrow in the direction Y of at least one region among the third region A3 to the fifth region A5.

The side surface SF3 and the side surface SF4 extend parallel to the direction Y in planar view. The side surface SF3 and the side surface SF4 are parallel in planar view. Lengths of the side surface SF3 and the side surface SF4 in the direction Y are the same. Incidentally, the lengths of the side surface SF3 and the side surface SF4 in the direction Y may be different.

The slope CP1 is a surface that connects an end portion of the side surface SF1 on the opposite side to the tip side of the arrow in the direction X and an end portion of the side surface SF3 on the opposite side to the tip side of the arrow in the direction Y. The slope CP1 extends from the end portion of the side surface SF1 on the opposite side to the tip side of the arrow in the direction X toward the end portion of the side surface SF3 on the opposite side to the tip side of the arrow in the direction Y obliquely to the opposite side to the tip side of the arrow in the direction X and to the tip side of the arrow in the direction Y in planar view.

For example, the slope CP1 extends from the end portion of the side surface SF1 on the opposite side to the tip side of the arrow in the direction X toward the end portion of the side surface SF3 on the opposite side to the tip side of the arrow in the direction Y obliquely at an angle of 45° to the opposite side to the tip side of the arrow in the direction X and to the tip side of the arrow in the direction Y in planar view.

Incidentally, for example, the slope CP1 may extend from the end portion of the side surface SF1 on the opposite side to the tip side of the arrow in the direction X toward the end portion of the side surface SF3 on the opposite side to the tip side of the arrow in the direction Y obliquely at an angle other than the angle of 45° to the opposite side to the tip side of the arrow in the direction X and to the tip side of the arrow in the direction Y in planar view.

The slope CP1 corresponds to, for example, an end surface on the opposite side to the tip side of the arrow in the direction Y of the third region A3. Incidentally, the slope CP1 may correspond to, for example, an end surface on the opposite side to the tip side of the arrow in the direction Y of a region other than the third region A3.

The slope CP2 is a surface that connects an end portion of the side surface SF1 on the tip side of the arrow in the direction X and an end portion of the side surface SF4 on the opposite side to the tip side of the arrow in the direction Y. The slope CP2 extends from the end portion of the side surface SF1 on the tip side of the arrow in the direction X toward the end portion of the side surface SF4 on the opposite side to the tip side of the arrow in the direction Y obliquely to the tip side of the arrow in the direction X and to the tip side of the arrow in the direction Y in planar view.

For example, the slope CP2 extends from the end portion of the side surface SF1 on the tip side of the arrow in the direction X toward the end portion of the side surface SF4 on the opposite side to the tip side of the arrow in the direction Y obliquely at an angle of 45° to the tip side of the arrow in the direction X and to the tip side of the arrow in the direction Y in planar view.

Incidentally, the slope CP2 may extend from the end portion of the side surface SF1 on the tip side of the arrow in the direction X toward the end portion of the side surface SF4 on the opposite side to the tip side of the arrow in the direction Y obliquely at an angle other than the angle of 45° to the tip side of the arrow in the direction X and to the tip side of the arrow in the direction Y in planar view.

The slope CP2 corresponds to, for example, an end surface on the opposite side to the tip side of the arrow in the direction Y of the fifth region A5. Incidentally, the slope CP2 may correspond to, for example, an end surface on the opposite side to the tip side of the arrow in the direction Y of a region other than the fifth region A5.

In the example shown in FIG. 10, a plurality of the light sources LS include a light source LS1, a light source LS2, a light source LS3, a light source LS4, a light source LS5, and a light source LS6. The light sources LS1 to LS6 are disposed in the described order in the direction X. The light sources LS1 to LS6 are configured such that a light intensity of the light source LS disposed on an end portion side (or the outer side) in the direction X is higher than a light intensity of the light source LS disposed at a central portion (or the inner side) in the direction X in order to make luminance uniform in the third region A3, the fourth region A4, and the fifth region A5.

In other words, the light sources LS1 to LS6 are configured such that a light intensity ratio of the light source LS disposed on the end portion side (or the outer side) in the direction X is higher than a light intensity ratio of the light source LS disposed at the central portion (or the inner side) in the direction X in order to make the luminance uniform in the third region A3, the fourth region A4, and the fifth region A5.

For example, light intensities of the light source LS1 and the light source LS6 are higher than light intensities of the light sources LS2 to LS5 in order to make the luminance uniform in the third region A3, the fourth region A4, and the fifth region A5. In other words, for example, light intensity ratios of the light source LS1 and the light source LS6 are higher the light intensity ratios of the light sources LS2 to LS5 in order to make the luminance uniform in the third region A3, the fourth region A4, and the fifth region A5.

Incidentally, the light sources LS1 to LS6 may be configured such that the light intensity thereof gradually increases from the light source LS disposed at the central portion (or the inner side) in the direction X toward the light source LS disposed on the end portion side (or the other side) in the direction X in order to make the luminance uniform in the third region A3, the fourth region A4, and the fifth region A5.

In other words, the light sources LS1 to LS6 may be configured such that the light intensity ratio thereof gradually increases from the light source LS disposed at the central portion (or the inner side) in the direction X toward the light source LS disposed on the end portion side (or the outer side) in the direction X in order to make the luminance uniform in the third region A3, the fourth region A4, and the fifth region A5.

For example, the light intensities of the light source LS2 and the light source LS5 are higher than the light intensities of the light source LS3 and the light source LS4 in order to make the luminance uniform in the third region A3, the fourth region A4, and the fifth region A5. The light intensities of the light source LS1 and the light source LS6 are higher than the light intensities of the light source LS2 and the light source LS5.

In other words, for example, the light intensity ratios of the light source LS2 and the light source LS5 are higher than the light intensity ratios of the light source LS3 and the light source LS4 in order to make the luminance uniform in the third region A3, the fourth region A4, and the fifth region A5. The light intensity ratios of the light source LS1 and the light source LS6 are higher than the light intensity ratios of the light source LS2 and the light source LS5.

For example, light intensities of outgoing light emitted from the light sources LS1 to LS6 are set such that a light intensity ratio of the outgoing light emitted from the light sources LS1 to LS6 becomes 3:1:1:1:1:3.

Incidentally, in a configuration in which the configuration of the present embodiment is combined with the configuration of the first embodiment or the second embodiment, the light intensities of the outgoing light emitted from the light sources LS1 to LS6 can be set such that a light intensity ratio of a plurality of beams of return light corresponding to a plurality of beams of the outgoing light emitted from the light sources LS1 to LS6 is 6:2:2:2:2:6.

According to the third embodiment, the illumination device IL includes the light guide LG, the light sources LS, a reflective layer RF, and a plurality of prisms PM. The light guide LG includes the side surface SF1, the side surface SF2 opposed to the side surface SF1, the side surface SF3 intersecting the side surface SF2, the side surface SF4 that intersects the side surface SF2 and is opposed to the side surface SF3, the slope CP1 connecting the side surface SF1 and the side surface SF3, and the slope CP2 connecting the side surface SF1 and the side surface SF4.

The light guide LG is formed in the hexagon shape having the slope CP1 and the slope CP2 formed by cutting out the two corner portions on the opposite side to the tip side of the arrow in the direction Y from the rectangle in planar view. In a case where a pair of the illumination devices IL (or display devices DSP) according to the present embodiment are used for virtual reality (VR) or the like, a space for accommodating a nose can be formed in a part of the slope CP1 or the slope CP2.

A length of the side surface SF1 in the direction X is shorter than a length of the side surface SF2 in the direction X. The lengths of the side surface SF3 and the side surface SF4 are the same. The slope CP1 connects the end portion of the side surface SF1 on the opposite side to the tip side of the arrow in the direction X and the end portion of the side surface SF3 on the opposite side to the tip side of the arrow in the direction Y.

The slope CP2 connects the end portion of the side surface SF1 on the tip side of the arrow in the direction X and the end portion of the side surface SF4 on the opposite side to the tip side of the arrow in the direction Y.

The light sources LS are arranged in the direction X along the side surface SF1. In the light sources LS, the light intensity ratio of the light source LS disposed on the end portion side in the direction X is higher than the light intensity ratio of the light source LS disposed in the central portion in the direction X. Therefore, the illumination device IL can improve the luminance uniformity. In other words, the display device DSP can also improve the luminance uniformity.

Modified Example 3

An illumination device IL according to Modified Example 3 of the third embodiment is different from the illumination devices IL according to the first embodiment, Modified Example 1, Modified Example 2, the second embodiment, and the third embodiment in terms of a configuration of a light guide LG.

Figure 11:
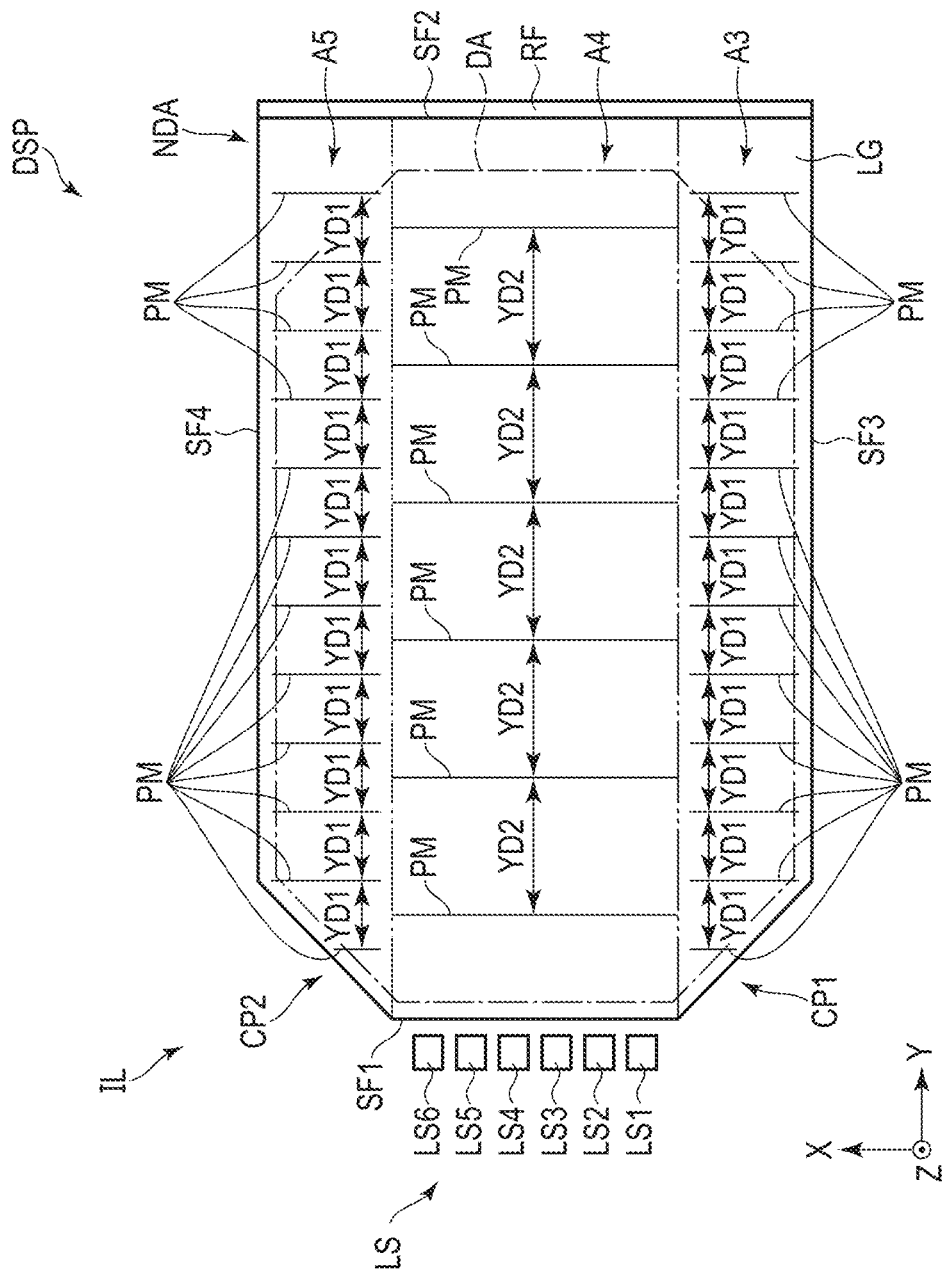
FIG. 11 is a plan view of an illumination device according to Modified Example 3.

FIG. 11 is a plan view of the illumination device IL according to Modified Example 3.

In the example shown in FIG. 11, in the light guide LG, a density of prisms PM on the outer side in a direction X is higher than a density of prisms PM at a central portion (or the inner side) in the direction X. For example, a density of prisms PM in a third region A3 and a fifth region A5 is higher than a density of prisms PM in a fourth region A4.

A density of the prisms PM corresponds to the number of prisms disposed in a predetermined area in planar view. For example, in the third region A3 and the fifth region A5, a plurality of the prisms PM are disposed at an interval YD1 in a direction Y. In addition, in the fourth region A4, a plurality of the prisms PM are disposed at an interval YD2, larger than the interval YD1, in the direction Y.

Light intensity ratios of the light sources LS may be the same or different. For example, the light sources LS have the same light intensity ratio. In addition, for example, in the light sources LS, a light intensity ratio of the light source LS disposed on an end portion side (or the outer side) in the direction X is higher than a light intensity ratio of the light source LS disposed at a central portion (or an inner side) in the direction X, which is similar to the third embodiment described above.

Modified Example 3 configured as above also has effects similar to those of the first embodiment, the second embodiment, the third embodiment, Modified Example 1, and Modified Example 2.

Based on the display device which has been described in the above-described embodiments, a person having ordinary skill in the art may achieve a display device with an arbitral design change; however, as long as they fall within the scope and spirit of the present invention, such a display device is will be encompassed by the scope of the present invention.

A skilled person would conceive various changes and modifications of the present invention within the scope of the technical concept of the invention, and naturally, such changes and modifications are encompassed by the scope of the present invention. For example, if a skilled person adds/deletes/alters a structural element or design to/from/in the above-described embodiments, or adds/deletes/alters a step or a condition to/from/in the above-described embodiment, as long as they fall within the scope and spirit of the present invention, such addition, deletion, and altercation are encompassed by the scope of the present invention.

Furthermore, regarding the present embodiments, any advantage and effect those will be obvious from the description of the specification or arbitrarily conceived by a skilled person are naturally considered achievable by the present invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. An illumination device comprising:
  a light guide including:
    a first side surface,
    a second side surface opposed to the first side surface in a first direction,
    a main surface, and
    an opposing surface opposed to the main surface in a second direction intersecting the first direction;
  a light source that is opposed to the first side surface and emits light to the first side surface;
  a reflective layer provided on the second side surface;
  a first prism provided on the opposing surface; and
  a second prism provided on a side closer to the second side surface in the first direction than the first prism on the opposing surface, wherein
  the light guide has a thickness in the second direction increasing from the first side surface toward the second side surface in the first direction, the opposing surface includes
   a first slope,
   a second slope located on a side closer to the second side surface than the first slope in the first direction,
   a third slope located on a side closer to the second side surface than the second slope in the first direction,
   a fourth slope located on a side closer to the second side surface than the third slope in the first direction,
   a first plane that connects the first slope and the second slope and is parallel to the main surface, and
   a second plane that connects the third slope and the fourth slope and is parallel to the main surface,
the first prism and the second prism have cross-sectional shapes being formed in a triangle shape protruding to an opposite side of the opposing surface in the second direction,
the first prism is disposed on the first plane,
the second prism is disposed on the second plane,
a first height of the first prism in the second direction is smaller than a second height of the second prism in the second direction, and
a sum of the first height, a third height of the first slope in the second direction, and a fourth height of the second slope in the second direction is larger than a sum of the second height, a fifth height of the third slope in the second direction, and a sixth height of the fourth slope in the second direction.

2. The illumination device according to claim 1, wherein the cross-sectional shapes of the first prism and the second prism are formed in an isosceles triangle shape in which two base angles are a first angle,
each of the first slope and the second slope is angled at the first angle with respect to the first plane, and
each of the third slope and the fourth slope is angled at the first angle with respect to the second plane.

3. The illumination device according to claim 2, further comprising a third prism disposed on the first plane, wherein
the third prism has a cross-sectional shape formed in an isosceles triangle shape in which two base angles are the first angle.

4. The illumination device according to claim 2, wherein the opposing surface has a third plane that connects the second slope and the third slope and is parallel to the main surface.

5. The illumination device according to claim 2, wherein the first angle is equal to or larger than a main ray angle of light emitted from the light source and incident on the light guide from the first side surface.

6. The illumination device according to claim 1, wherein the third height and the fourth height are same,
the fifth height and the sixth height are same, and
the third height and the fourth height are larger than the fifth height and the sixth height.

7. The illumination device according to claim 1, wherein the light guide includes
   a third side surface intersecting the second side surface,
   a fourth side surface that is opposed to the third side surface in a third direction intersecting the first direction and the second direction and intersects the second side surface,
   a first surface connecting the first side surface and the third side surface, and
   a second surface connecting the first side surface and the fourth side surface,
the light source includes a first light source, a second light source, and a third light source,
a first length of the first side surface in the third direction is smaller than a second length of the second side surface in the third direction,
the second light source is interposed between the first light source and the third light source in the third direction, and
a first light intensity ratio of the first light source and the third light source is higher than a second light intensity ratio of the second light source.

8. A display device comprising:
the illumination device according to claim 1; and
a display panel that displays an image, wherein
the display panel is opposed to the illumination device.

* * * * *